United States Patent
Tokie

(10) Patent No.: US 10,248,638 B2
(45) Date of Patent: Apr. 2, 2019

(54) CREATING FORMS FOR HIERARCHICAL ORGANIZATIONS

(71) Applicant: FUJI XEROX CO., LTD., Tokyo (JP)

(72) Inventor: Katsuji Tokie, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 682 days.

(21) Appl. No.: 14/613,572

(22) Filed: Feb. 4, 2015

(65) Prior Publication Data
US 2015/0234802 A1   Aug. 20, 2015

(30) Foreign Application Priority Data
Feb. 19, 2014   (JP) .................................. 2014-029470

(51) Int. Cl.
*G06F 17/24*   (2006.01)
*G06F 9/451*   (2018.01)

(52) U.S. Cl.
CPC ............ *G06F 17/243* (2013.01); *G06F 9/453* (2018.02)

(58) Field of Classification Search
CPC .............................. G06F 17/243; G06F 9/4446
USPC .......................................................... 715/224
See application file for complete search history.

(56) References Cited

U.S. PATENT DOCUMENTS

| 5,267,303 A * | 11/1993 | Johnson ............. H04N 1/32771 358/436 |
| 5,282,052 A * | 1/1994 | Johnson ................ G06F 17/243 358/402 |
| 6,442,526 B1 * | 8/2002 | Vance .................... G06Q 10/02 705/30 |

(Continued)

FOREIGN PATENT DOCUMENTS

| JP | 2006-058936 A | 3/2006 |
| JP | 2008-026939 A | 2/2008 |
| JP | 2011-198103 A | 10/2011 |

OTHER PUBLICATIONS

"Using Content Controls to Repeat Form Fields in Microsoft Word 2007 and Word 2010"; John Chapman; <http://www.johnchapman.net/technology/sharepoint/using-content-controls-to-repeat-form-fields-in-microsoft-word-2007-and-word-2010/>; Published Apr. 9, 2010.*

(Continued)

*Primary Examiner* — Stephen S Hong
*Assistant Examiner* — Broderick C Anderson
(74) *Attorney, Agent, or Firm* — Sughrue Mion, PLLC

(57) ABSTRACT

Provided is an information input system including an information input field display section that displays an information input field for inputting information for each of plural persons inputting information, a specified problem input field display section that displays a specified problem input field for inputting a character string indicating a specified problem with respect to the input information for a problem- (Continued)

specifying person, a recording section that associates and records character string information with the information input field when an input of the character string is received from the problem-specifying person, and a guidance display section that displays, as input guidance, at least one character string information item, which is recorded by the recording section, along with the information input field when a request for display of the information input field is received from any one of the plural persons inputting information.

21 Claims, 19 Drawing Sheets

(56) References Cited

U.S. PATENT DOCUMENTS

| | | | | |
|---|---|---|---|---|
| 7,050,986 | B1* | 5/2006 | Vance | G06Q 10/02 |
| | | | | 705/5 |
| 2002/0161611 | A1* | 10/2002 | Price | G06Q 30/02 |
| | | | | 705/346 |
| 2004/0205530 | A1* | 10/2004 | Borg | G06F 17/243 |
| | | | | 715/226 |
| 2005/0268218 | A1* | 12/2005 | Yoshimura | G06F 17/243 |
| | | | | 715/221 |
| 2007/0011606 | A1* | 1/2007 | Bagheri | G06F 17/243 |
| | | | | 715/233 |
| 2007/0192678 | A1* | 8/2007 | Tang | G06F 17/243 |
| | | | | 715/234 |
| 2008/0052203 | A1* | 2/2008 | Beyer | G06Q 10/087 |
| | | | | 705/28 |
| 2009/0313225 | A1* | 12/2009 | Nordlinger | G06Q 10/10 |
| 2012/0095585 | A1* | 4/2012 | Agarwal | G06Q 10/06 |
| | | | | 700/109 |
| 2012/0166929 | A1* | 6/2012 | Henderson | G06F 17/243 |
| | | | | 715/224 |
| 2016/0246769 | A1* | 8/2016 | Screen | G06F 17/243 |

OTHER PUBLICATIONS

"Use Google Forms to Create a Survey"; Andy Wolber; TechRepublic; <www.techrepublic.com/blog/google-in-the-enterprise/use-google-forms-to-create-a-survey/>; Published prior to: Jul. 30, 2013.*
"How Google Instants Autocomplete Suggestions Work"; Danny Sullivan; <http://searchengineland.com/how-google-instant-autocomplete-suggestions-work-62592>; published prior to Apr. 8, 2011.*
"The Advantages & Disadvantages of Creating Subsidiary & Operating Companies"; Chirantan Basu; <http://smallbusiness.chron.com/advantages-disadvantages-creating-subsidiary-operating-companies-25733.html>; published prior to Apr. 26, 2012.*
"The 8 Sources of Waste and How to Eliminate Them"; Kavanagh et al; <http://www.gfoa.org/sites/default/files/GFR_DEC_11_18.pdf>; published Dec. 2011.*
Communication dated Jan. 17, 2017 from the Japanese Patent Office in counterpart Application No. 2014-029470.

* cited by examiner

TRANSPORTATION COST CLEARING — 30

| Field | | Hints |
|---|---|---|
| DESTINATION — 31,31A | [ ] | OK HINT / NG HINT / AVD HINT — 33,33A |
| PURPOSE OF VISITING | [ ] | OK HINT / NG HINT / AVD HINT |
| DATE OF VISITING | [ ] | OK HINT / NG HINT / AVD HINT |
| USED TRANSPORT FACILITY | [ ] | OK HINT / NG HINT / AVD HINT |
| TRANSPORTATION COST | [ ] | OK HINT / NG HINT / AVD HINT |

Callout (36A):
- SPECIFIED PERSON YOU VISITED SHOULD BE DESCRIBED
- × × ×
- × × ×

[ OK ]  [ CANCEL ]

TRANSPORTATION COST CLEARING APPROVAL SCREEN

TRANSPORTATION COST CLEARING FOR PERSON A INPUTTING INFORMATION (ID0001)

| | | | |
|---|---|---|---|
| DESTINATION | EXAMINER ○○ OF PATENT OFFICE | | 41,41A |
| PURPOSE OF VISITING | | | 41,41B |
| DATE OF VISITING | JANUARY 7, 2013 | | 41,41C |
| USED TRANSPORT FACILITY | SUBWAY | | 41,41D |
| TRANSPORTATION COST | 190 | JPY | 41,41E |

[ OK ]   [ CANCEL ]

FIG. 3B

TRANSPORTATION COST CLEARING APPROVAL SCREEN — 40

TRANSPORTATION COST CLEARING FOR PERSON A INPUTTING INFORMATION (ID0001)

| | | |
|---|---|---|
| DESTINATION | EXAMINER ○○ OF PATENT OFFICE | |
| PURPOSE OF VISITING | | THIS IS ESSENTIAL INPUT ITEM — 41, 41B |
| DATE OF VISITING | JANUARY 7, 2013 | THIS SHOULD BE BASED ON WESTERN CALENDAR — 41, 41C |
| USED TRANSPORT FACILITY | SUBWAY | |
| TRANSPORTATION COST | 190 JPY | |

OK   CANCEL

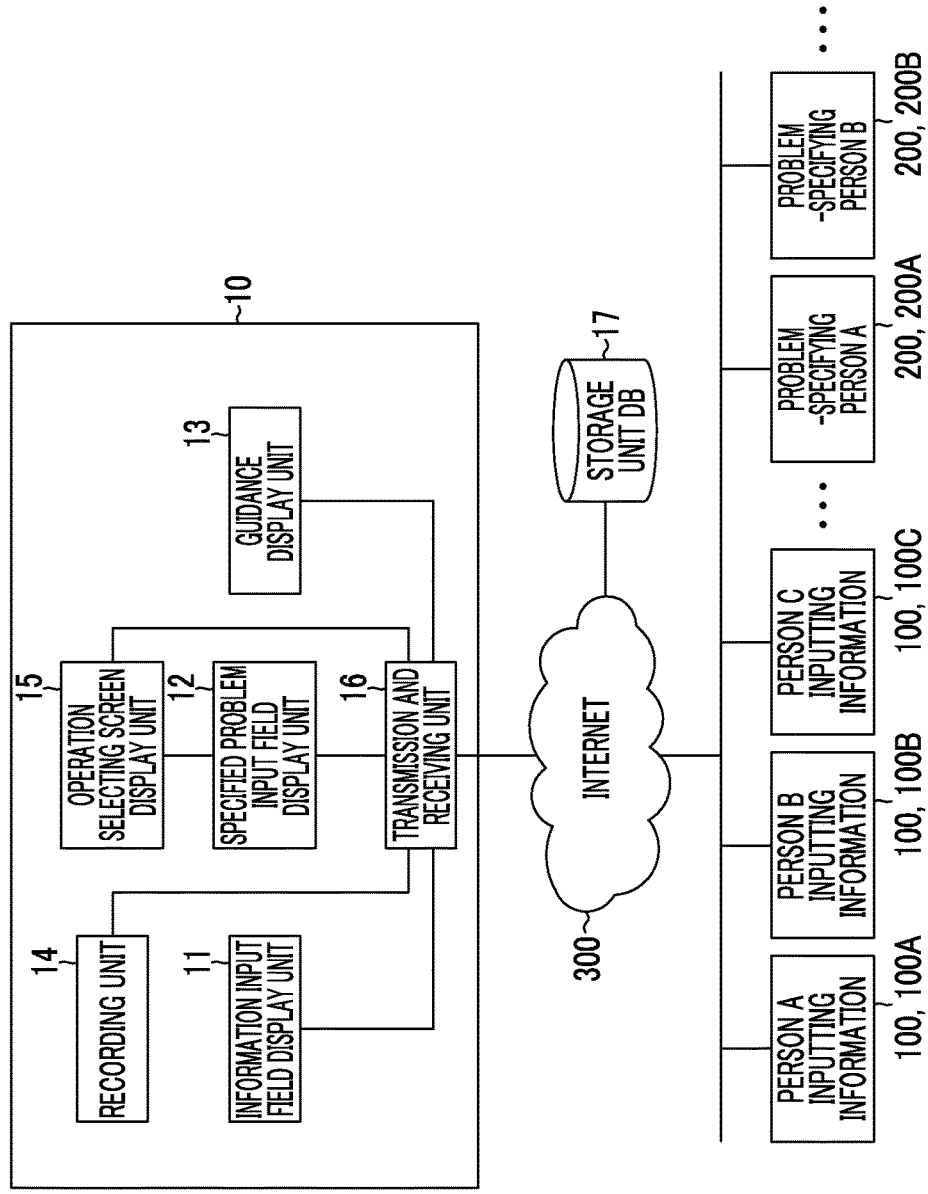

| TABLE OF PERSON INPUTTING INFORMATION | | | |
|---|---|---|---|
| | ID OF PERSON INPUTTING INFORMATION | PROBLEM-SPECIFYING PERSON ID | GROUP ID |
| ... | ... | ... | ... |
| PERSON A INPUTTING INFORMATION | U0001 | Null | 0011 |
| PERSON B INPUTTING INFORMATION | U0002 | Null | 0011 |
| PERSON C INPUTTING INFORMATION | U0003 | Null | 0012 |
| PERSON D INPUTTING INFORMATION | U0004 | Null | 0012 |
| ... | ... | ... | ... |
| PROBLEM-SPECIFYING PERSON A | U000X | U1001 | 0151 |
| PROBLEM-SPECIFYING PERSON B | U000Y | U1002 | 0151 |
| PROBLEM-SPECIFYING PERSON C | U00ZZ | U2003 | 0291 |
| ... | ... | ... | ... |

FIG. 6

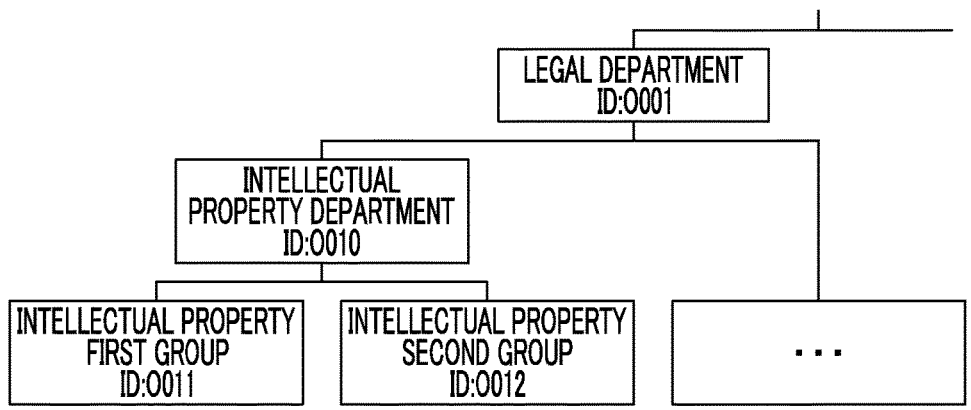

| ORGANIZATION TABLE | | |
|---|---|---|
| GROUP ID | GROUP NAME | PARENT GROUP ID |
| | | . . . |
| O011 | INTELLECTUAL PROPERTY FIRST GROUP | O010 |
| O012 | INTELLECTUAL PROPERTY SECOND GROUP | O010 |
| O151 | ACCOUNTING FIRST GROUP | O150 |
| O152 | ACCOUNTING SECOND GROUP | O150 |
| O291 | MANAGERIAL AUDIT DEPARTMENT | O290 |
| . . . | . . . | . . . |

| OPERATION TABLE ||||
|---|---|---|---|
| OPERATION ID | OPERATION | INFORMATION INPUT FIELD ID | INFORMATION INPUT FIELD |
| ... | | ... | ... |
| W1001 | COST APPLICATION | I1101 | ACCOUNT ITEM |
| | | I1102 | BREAKDOWN |
| | | ... | ... |
| W1002 | TRANSPORTATION COST CLEARING | I1201 | DESTINATION |
| | | I1202 | PURPOSE OF VISITING |
| | | I1203 | DATE OF VISITING |
| | | I1204 | USED TRANSPORT FACILITY |
| | | I1205 | TRANSPORTATION COST |
| W1003 | LUMP-SUM PAYMENT APPLICATION | I1301 | ACCOUNT ITEM |
| | | I1302 | BREAKDOWN |
| | | ... | ... |
| ... | ... | ... | ... |

| OPERATION SELECTING SCREEN TABLE ||||
|---|---|---|---|
| OPERATION SELECTING SCREEN ID | OPERATION SELECTING SCREEN | OPERATION ID | OPERATION |
| ... | ... | ... | ... |
| S0001 | ACCOUNTING APPLICATION | W1001 | COST APPLICATION |
| | | W1002 | TRANSPORTATION COST CLEARING |
| | | W1003 | LUMP-SUM PAYMENT APPLICATION |
| | | W1004 | PROVISIONAL PAYMENT APPLICATION |
| S0002 | ATTENDANCE MANAGEMENT | W2001 | PAID HOLIDAY APPLICATION |
| | | W2002 | SPECIAL HOLIDAY APPLICATION |
| | | W2003 | CHILD-CARE LEAVE APPLICATION |
| | | W2004 | CARE LEAVE APPLICATION |
| ... | ... | ... | ... |

FIG. 10

OPERATION SELECTING HISTORY TABLE 60

| INPUT DATE, MONTH, AND YEAR | ID OF PERSON INPUTTING INFORMATION | OPERATION SELECTING SCREEN ID | OPERATION ID |
|---|---|---|---|
| ... | ... | ... | ... |
| 1/10/2013 | U0001 | S0001 | W1002 |
| 1/10/2013 | U0002 | S0001 | W1001 |
| 1/10/2013 | U0001 | S0001 | W1002 |
| 1/11/2013 | U0001 | S0001 | W1001 |
| 1/11/2013 | U0003 | S0002 | W2003 |
| 1/12/2013 | U0003 | S0001 | W1001 |
| 1/12/2013 | U0001 | S0001 | W1002 |
| ... | ... | ... | ... |

FIG. 11

INPUT INFORMATION RECORDING TABLE 50

| INPUT DATE, MONTH, AND YEAR | SERVICE ID | ID OF PERSON INPUTTING INFORMATION | OPERATION ID | INFORMATION INPUT FIELD ID | INPUT INFORMATION |
|---|---|---|---|---|---|
| ... | ... | ... | ... | ... | ... |
| 1/10/2013 | T0001 | U0001 | W1002 | I1201 | EXAMINER ○○ OF PATENT OFFICE |
| | | | | I1202 | Null |
| | | | | I1203 | JANUARY 7, 2013 |
| | | | | I1204 | SUBWAY |
| | | | | I1205 | 190 |
| 1/10/2013 | T0002 | U0002 | W1001 | I1101 | TRAINING COST |
| | | | | I1102 | SEMINAR RELATING TO LAY AMENDMENT |
| ... | ... | ... | ... | ... | ... |

FIG. 12

CHARACTER STRING INFORMATION RECORDING TABLE 70

| PROCESSING DATE, MONTH, AND YEAR | PROCESSING ID | PROBLEM-SPECIFYING PERSON ID | SERVICE ID | ID OF PERSON INPUTTING INFORMATION | OPERATION ID | INFORMATION INPUT FIELD ID | CHARACTER STRING INFORMATION |
|---|---|---|---|---|---|---|---|
| ... | ... | ... | ... | ... | ... | ... | ... |
| 1/10/2013 | R0001 | U1002 | T0001 | U0001 | W1002 | I1202 | THIS IS ESSENTIAL INPUT ITEM |
| 1/12/2013 | R0006 | U1002 | T0006 | U0003 | W1001 | I1203 | THIS SHOULD BE BASED ON WESTERN CALENDAR |
| 1/12/2013 | R0007 | U2003 | T0007 | U0001 | W1002 | I1101 | CORRECT ACCOUNT ITEM SHOULD BE INPUT |
|  |  |  |  |  |  | I1204 | NAME OF TRANSPORTATION FACILITY SHOULD BE DESCRIBED WITH FROM WHERE TO WHERE YOU USED IT |
| ... | ... | ... | ... | ... | ... | ... | ... |

FIG. 13

PROCESSING HISTORY TABLE 80

| PROCESSING DATE, MONTH, AND YEAR | PROBLEM-SPECIFYING PERSON ID | PROCESSING ID | ID OF PERSON INPUTTING INFORMATION | SERVICE ID | OPERATION ID | RESULT FLAG APPROVED | RESULT FLAG REJECTED | AUDIT |
|---|---|---|---|---|---|---|---|---|
| ... | ... | ... | ... | ... | ... | ... | ... | ... |
| 1/10/2013 | U1002 | R0001 | U0001 | T0001 | W1002 | 0 | 1 | 0 |
| 1/10/2013 | U1002 | R0002 | U0002 | T0002 | W1001 | 1 | 0 | 0 |
| 1/10/2013 | U1002 | R0003 | U0001 | T0003 | W1002 | 1 | 0 | 0 |
| 1/11/2013 | U1003 | R0004 | U0003 | T0005 | W1001 | 1 | 0 | 0 |
| 1/11/2013 | U1002 | R0005 | U0001 | T0004 | W2003 | 0 | 1 | 0 |
| 1/12/2013 | U1002 | R0006 | U0001 | T0006 | W1001 | 1 | 0 | 0 |
| 1/12/2013 | U1003 | R0007 | U0001 | T0007 | W1002 | 1 | 0 | 1 |
| ... | ... | ... | ... | ... | ... | ... | ... | ... |

CREATING FORMS FOR HIERARCHICAL ORGANIZATIONS

CROSS-REFERENCE TO RELATED APPLICATIONS

This application is based on and claims priority under 35 USC 119 from Japanese Patent Application No. 2014-029470 filed Feb. 19, 2014.

BACKGROUND

Technical Field

The present invention relates to an information input system and a non-transitory computer readable medium storing a program.

SUMMARY

According to an aspect of the invention, there is provided an information input system including:

an information input field display section that displays an information input field for inputting information for each of plural persons inputting information;

a specified problem input field display section that displays a specified problem input field for inputting a character string indicating a specified problem with respect to the input information for a problem-specifying person who is different from the plural persons inputting information, a recording section that associates and records character string information with the information input field when an input of the character string is received from the problem-specifying person; and a guidance display section that displays, as input guidance, at least one character string information item, which is recorded by the recording section, along with the information input field when a request for display of the information input field is received from any one of the plural persons inputting information.

BRIEF DESCRIPTION OF THE DRAWINGS

Exemplary embodiments of the present invention will be described in detail based on the following figures, wherein:

FIG. 2A is a diagram showing an example of an information input screen which is displayed by an information input field display unit for displaying an information input field for inputting information relating to "transportation cost clearing";

FIG. 2B is a diagram showing a state in which input information (specified problem which is a basis of rejection) that a problem-specifying person B inputs for the person A inputting information is displayed as input guidance along with an information input field;

FIG. 2C is a diagram showing a state in which the person A inputting information inputs content to be input to each information input field on the screen shown in FIG. 2A;

FIG. 3A is a diagram showing an example of a specified problem input screen which is displayed by a specified problem input field display unit for displaying a specified problem input field where the problem-specifying person B inputs a character string indicating a problem specified in input information that the person A inputting information inputs;

FIG. 3B is a diagram showing a state in which the problem-specifying person B inputs the character string indicating the specified problem into the specified problem input field on the specified problem input screen shown in FIG. 3A;

FIG. 4 is a block diagram showing a main configuration example of an information input system according to an exemplary embodiment of the invention;

FIG. 5 is a diagram showing an example of a table of person inputting information, in which IDs of person inputting information for specifying respective persons inputting information who use the information input system are associated and recorded with group IDs for specifying groups to which the respective persons inputting information belong;

FIG. 6 is a diagram showing that there is a hierarchical organization structure indicating a parent-child relationship between the respective groups to which the persons inputting information who use information input system belong;

FIG. 7 is a diagram showing an example of an organization table in which group IDs for specifying groups to which the respective persons inputting information who use the information input system belong are associated and recorded with parent group IDs for specifying parent groups of the groups;

FIG. 8 is a diagram showing an example of an operation table in which operation IDs for specifying operations of inputting information to at least one information input field are associated and recorded with information input field IDs for specifying at least one information input field configuring the operation;

FIG. 9 is a diagram showing an example of an operation selection screen table in which operation selecting screen IDs for specifying operation selecting screens configured to receive selection of an operation by the person inputting information are associated and recorded with operation IDs of at least one operation which configures the operation selecting screens;

FIG. 10 is a diagram showing an example of an operation selecting history table indicating history information of operations which are recorded by a recording unit and are selected by the respective persons inputting information on the respective operation selecting screens;

FIG. 11 is a diagram showing an example of an input information recording table in which the recording unit associates and records input information with the respective information input field IDs for specifying information input fields with the information input therein;

FIG. 12 is a diagram showing an example of a character string information recording table in which the recording unit associates and records character string information indicating specified problems with the respective information input fields with character strings indicating the specified problems input therein;

FIG. 13 is a diagram showing an example of a processing history table, which is recorded by the recording unit, and in which results of processing performed by the respective problem-specifying persons are recorded;

DETAILED DESCRIPTION

Figure 1A:
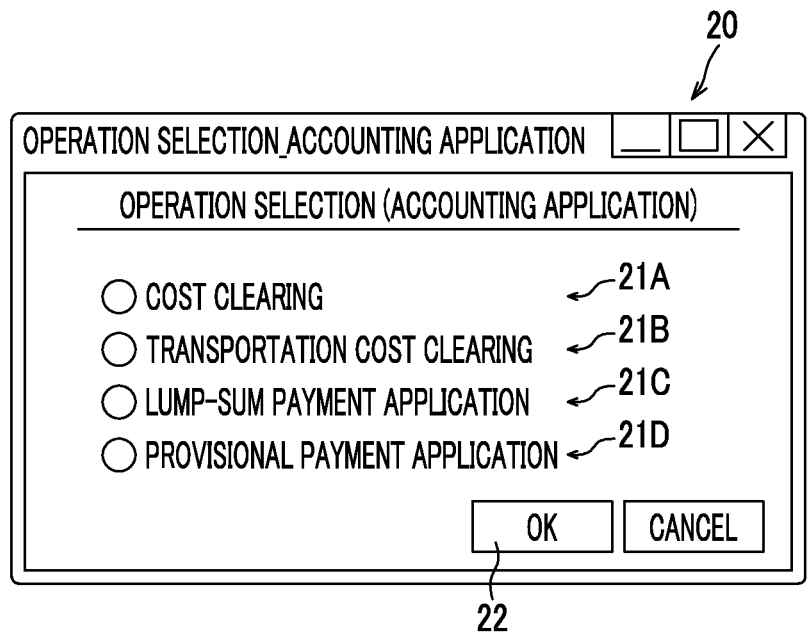
FIG. 1A is a diagram showing an example of an operation selection screen as a screen displayed by an operation selection screen display unit for receiving a request for displaying an information input field, which configures an operation, from a person inputting information.

Hereinafter, a description will be given of an information input system according to a first exemplary embodiment of the invention with reference to drawings.

The information input system according to the first exemplary embodiment of the invention includes: an information input field display section that displays an information input field for inputting information for each of plural persons inputting information; a specified problem input field display section that displays a specified problem input field for inputting a character string indicating a specified problem with respect to the input information for a problem-specifying person who is different from the plural persons inputting information, a recording section that associates and records character string information with the information input field when an input of the character string is received from the problem-specifying person; and a guidance display section that displays, as an input guidance, at least one character string information item, which is recorded by the recording section, along with the information input field when a request for display of the information input field is received from any of the plural persons inputting information.

The information input system according to an exemplary embodiment of the invention may be applied to various management systems such as business service systems used for company activities and the like (for example, a financial and management accounting system, a personal affairs and salary system, a sales and selling system, a production management system, a logistics and inventory management system, and an internal control system).

For example, when an information-inputting person A who is one of plural persons inputting information inputs information to at least one information input field by using a computer terminal or the like, and a long time has passed after the last input, the person A inputting information forgets specific input content in many cases. In such cases, the person A inputting information is forced to check an input manual or the like every time the person A inputting information tries to input information, there is a concern that efficiency of the input operation will deteriorate. Even in a case of a business service system which is used on a daily basis, if content to be input is complicated, then the person A inputting information performs an input operation by referring to the input manual every time the person A inputting information tries to input the complicated content in many cases, and there is a concern in that efficiency of the input operation deteriorates.

In addition, when the person inputting information inputs information to at least one information input field by using a computer terminal or the like, the person repeats erroneous input of information that the person input in the past in many cases. Moreover, the erroneous input of the information that the person inputting information typically makes is also made by other persons inputting information in the same manner in many cases.

The information input system according to an exemplary embodiment of the invention supports the input of information by a person inputting information by using information from a problem-specifying person (for example, an approver who conducted processing such as approval and/or rejection or an auditor who conducted audit and specified a problem or the like) who specified a problem in information input to the information input field when the person inputting information inputs the information to the information input field.

In addition, the information input system according to an exemplary embodiment of the invention allows the person inputting information to refer to a character string, which is input by the problems-specifying person with respect to the information input to the information input field and indicates the specified problem, as input guidance when the person inputting information inputs the input information to the information input field.

With such a configuration, the person inputting information refers to the problem specified by the problem-specifying person with respect to the information input field every time the person inputting information inputs information to the information input field, for example. Therefore, the person inputting information inputs the input information without repeating a similar error in order so that the same problem is not specified again.

Here, the character string indicating the specified problem to be referred to as the input guidance by the person inputting information is one or more aligned characters and is configured of alphabets, numbers, hiragana, katakana, various symbols, or the like. That is, the character string information is information which includes one or more aligned characters and is configured of alphabets, numbers, hiragana, katakana, various symbols, or the like.

As described above, the information input system allows the person inputting information to refer to a character string indicating a specified problem as an input guidance, and as a result, the person inputting information refers to input information which is erroneously input to the information input field in the past in more detail or in a more specific manner.

The problem-specifying person according to the invention is a person who inputs a character string indicating a problem specified in input information with respect to the input information that a person inputting information inputs to an information input field, as described above. Examples of the problem-specifying person include an approver who checks whether or not the input information is appropriate and approves and/or rejects the input information and an auditor who compares the input information to a predetermined rule and audits to determine whether or not there is a problem. However, the problem-specifying person according to the invention is not limited to the aforementioned approver or the auditor.

Hereinafter, a detailed description will be given of an information input system according to the first exemplary embodiment of the invention by exemplifying a case where a person A inputting information as one of plural persons inputting information inputs information to a predetermined information input field for an operation of clearing transportation costs and then a problem-specifying person B who is an approver approving the clearing of the transportation costs approves or rejects the clearing of the transportation costs of the person A inputting information by using the information input system according to the first exemplary embodiment of the invention.

First, a description will be given of an example of a business service flow in which the person A inputting information inputs information to a predetermined information input field for an operation of clearing transportation costs by using the information input system according to the first exemplary embodiment of the invention.

A request for display of the information input field, which is for inputting the input information for clearing the transportation cost, from the person A inputting information may be made by displaying an operation selection screen as shown in FIG. 1A, for example, on a display of the computer terminal so that the person A inputting information uses and receives selection of "transportation cost clearing" as an operation performed on the operation selecting screen by the person A inputting information.

As described above, the information input system may be provided with an operation selection screen display unit for displaying the operation selecting screen as shown in FIG. 1A, for example, configured to receive the request of display of at least one information input field, which configures an operation of the person inputting information for clearing transportation costs or the like.

FIG. 1A is a diagram showing an example of the operation selecting screen as a screen configured to be displayed by the operation selecting screen display unit and receive a request for displaying an information input field, which configures an operation of a person inputting information.

In FIG. 1A, a screen (operation selecting screen 20) configured to receive selection of any of operations for "cost clearing", "transportation cost clearing", "lump-sum payment application", and "provisional payment application". In addition, the person A inputting information selects an operation 21B for "transportation cost clearing" among the plural operation candidates (operations 21A to 21D) shown in FIG. 1A (that is, the person A inputting information checks "transportation cost clearing" on the screen shown in FIG. 1A and presses OK button 22.)

Figure 2A:
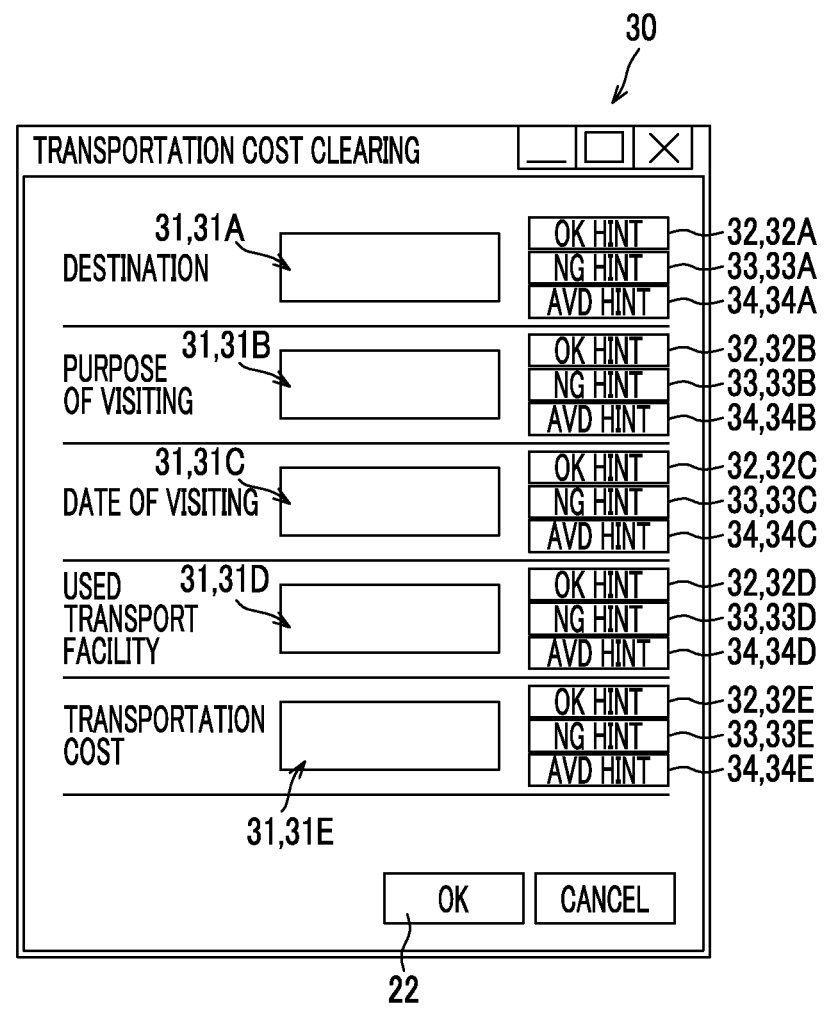

If the operation for transportation cost clearing is selected by the person A inputting information, and a request for displaying an information input field which configures the transportation cost clearing is received, the information input field display unit in the information input system displays an information input field to which the person A inputting information inputs information in the operation for "transportation cost clearing" as shown in FIG. 2A, for example, on the display of the computer terminal, for example, so that the person A inputting information uses the information.

FIG. 2A is a diagram showing an example of an information input screen which is displayed by the information input field display unit and displays the information input field for inputting information relating to "transportation cost clearing".

As information input fields 31 to which the person A inputting information may input the input information for the transportation cost clearing, "destination" (information input field 31A), "purpose of visiting" (information input field 31B), "date of visiting" (information input field 31C), "used transport facility" (information input field 31D), and "transportation cost" (information input field 31E) are displayed on an information input screen 30 shown in FIG. 2A.

The person A inputting information performs transportation cost clearing by inputting the input information to the respective information input fields 31 on the information input screen 30.

Here, "NG hint (rejection hint)" buttons 33 for referring to "NG hints (rejection hints)" are provided with the respective information input fields 31 on the information input screen 30 shown in FIG. 2A. In addition, "OK hint" buttons 32 for referring to "OK hints" and "Aud hint (audit hint)" buttons 34 for referring to "Aud hints (audit hints)" may be provided along with the information input fields 31 as shown in FIG. 2A.

If the person A inputting information presses an "NG hint" button 33 on the information input screen 30, a guidance display unit in the information input system displays, as input guidance, a character string (specified problem which is a basis of rejection) indicating a specified problem input by the problem-specifying person B with respect to input information which was input to the corresponding information input field 31 by the person A inputting information in the past, and directs the person A inputting information not to input the same information, which was rejected by the problem-specifying person B in the past, again.

If the person A inputting information presses an "OK hint" button 32 on the information input screen 30 shown in FIG. 2A, the information input system displays, as input guidance, input information which was input to the information input field 31 in the past by the person A inputting information, is determined not to include any improper parts, and is approved by the problem-specifying person B.

If the person A inputting information presses an "Aud hint" button 34 on the information input screen 30 shown in FIG. 2A, the information input system displays, as input guidance, a character string (problem specified in audit) indicating a specified problem input by a problem-specifying person C as an auditor with respect to input information that the person A inputting information input to the corresponding information input field 31 in the past, and directs the person A inputting information not to input the same information, which is specified by the problem-specifying person C in the audit, again.

FIG. 2B is a diagram showing a state in which input information (specified problem which is a basis of rejection) input by the problem-specifying person B for the person A inputting information is displayed as input guidance along with an information input field.

If the person A inputting information presses an "NG hint" button 33A being displayed along with the information input field 31A for "destination" on the information input screen 30 shown in FIG. 2A, the information input system allows the person A inputting information to refer to input information (specified problem 36 which is a basis for rejection) input by the problem-specifying person B with respect to the input information that the person A inputting information input to the information input field 31A for "destination" in the past, as shown in FIG. 2A.

FIG. 2B shows a state in which the information input system directs the person A inputting information not to repeat the same erroneous input by allowing the person A inputting information to refer to a specified problem "specified person you visited should be described" which was pointed out by the problem-specifying person B in the past when the person A inputting information input information to the information input field 31A for "destination".

Figure 2C:
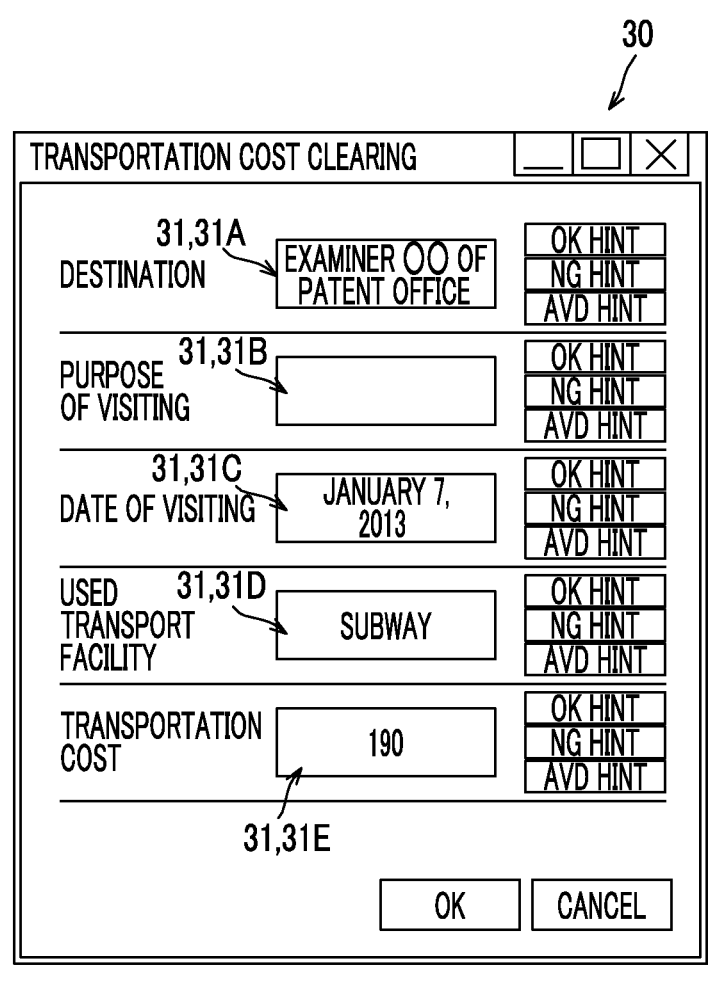

FIG. 2C is a diagram showing a state in which the person A inputting information inputs content to be input to the respective information input fields on the screen shown in FIG. 2A.

FIG. 2C shows a state in which the person A inputting information inputs, as input information, "Examiner OO of Patent Office" into the information input field 31A for inputting "destination", maintains the information input field 31B for inputting "purpose of visiting" so as to be blank, which is therefore filled with "Null", input "Jan. 7, 2013" in the information input field 31 for inputting "date of visiting", input "subway" to the information input field 31D for inputting "used transport facility", and input "190 (JPY)" to the information input field 31E for inputting "transportation cost".

Since the person A inputting information specified a person that the person A inputting information visited as "Examiner OO of Patent Office" and input the input information to the information input field 31A which is for inputting "destination" after referring to the specified problem "specified person you visited should be described" which is displayed by the guidance display unit, the person A inputting information avoided a state in which the same problem is pointed out by the problem-specifying person A in relation to the input to the information input field 31A for inputting "destination".

A specified problem input field display unit in the information input system receives the input to the information input field 31, which configures the transportation cost clearing for the person A inputting information, and then displays, on a display of a computer terminal used by the problem-specifying person B, for example, a specified problem input field for the problem-specifying person B inputting a character string indicating a problem specified in the input information.

FIG. 3A is a diagram showing an example of a specified problem input screen which is displayed by the specified problem input field display unit for displaying a specified problem input field where the problem-specifying person B inputs a character string indicating a problem specified in input information that the person A inputting information inputs.

On a specified problem input screen 40 shown in FIG. 3A, specified problem input fields 41 for receiving character strings indicating problems to be specified in the input information by the problem-specifying person B are displayed along with content of input that the person A inputting information input to the respective information input fields.

Here, if the problem-specifying person input a character string indicating a specified problem to any one of the specified problem input fields on the screen (specified problem input screen 40) for displaying the specified problem input fields for the problem-specifying person B, this means that the problem-specifying person B did not approve the input information that the person A inputting information input and rejected the input information.

In contrast, if the problem-specifying person B did not input, on the specified problem input screen 40, any character string indicating a problem specified in the input information that the person A inputting information input, this means that the problem-specifying person B approved the input information that the person A inputting information input.

FIG. 3B is a diagram showing a state in which the problem-specifying person B inputs the character string indicating the specified problem to the specified problem input field on the specified problem input screen shown in FIG. 3A.

Referring to FIG. 3B, a character string indicating a specified problem of "this is an essential input item" is input to the specified problem input field 41B for the input information "Null (blank)" so that the person A inputting information inputs to the information input field 31B for "destination" on the information input screen 30, so that the problem-specifying person B points out that some purpose should be input to the information input field 31B for "purpose of visiting".

In relation to the state in which the person A inputting information inputs the input information "Jan. 7, 2013" to the information input field 31C for "date of visiting" by using a Japanese era name on the information input screen 30, the problem-specifying person B inputs a character string indicating a specified problem "this should be based on the western calendar" to the specified problem input field 41C in order to point out that an input to the information input field 31C for inputting "date of visiting" is to be made by using the western calendar according to a company rule.

That is, the problem-specifying person B determines that there is an improper part in the input information that the person A inputting information inputs for the transportation cost clearing, inputs the character string indicating the specified problem to the specified problem input fields, and rejects the operation by the person A inputting information for "transportation cost clearing" without approving the operation.

After "transportation cost clearing" is rejected by the problem-specifying person B, the person A inputting information requests the information input system to display the information input fields configuring "transportation cost clearing" again in order to perform "transportation cost clearing" again.

The information input system receives the request from the person A inputting information, and then displays the information input fields relating to the operation for "transportation cost clearing" again (displays the information input screen 30). At this time, the guidance display section displays, as input guidance, character string information of "this is an essential input item" and "this should be based on the western calendar", which are input by the problem-specifying person B as specified problems, along with "purpose of visiting" in the information input field 31B and "date of visiting" in the information input field 31C with respect to the input information that the person A inputting information inputs in the information input field 31B for "purpose of visiting" and in the information input field 31C for "date of visiting".

Figure 2D:
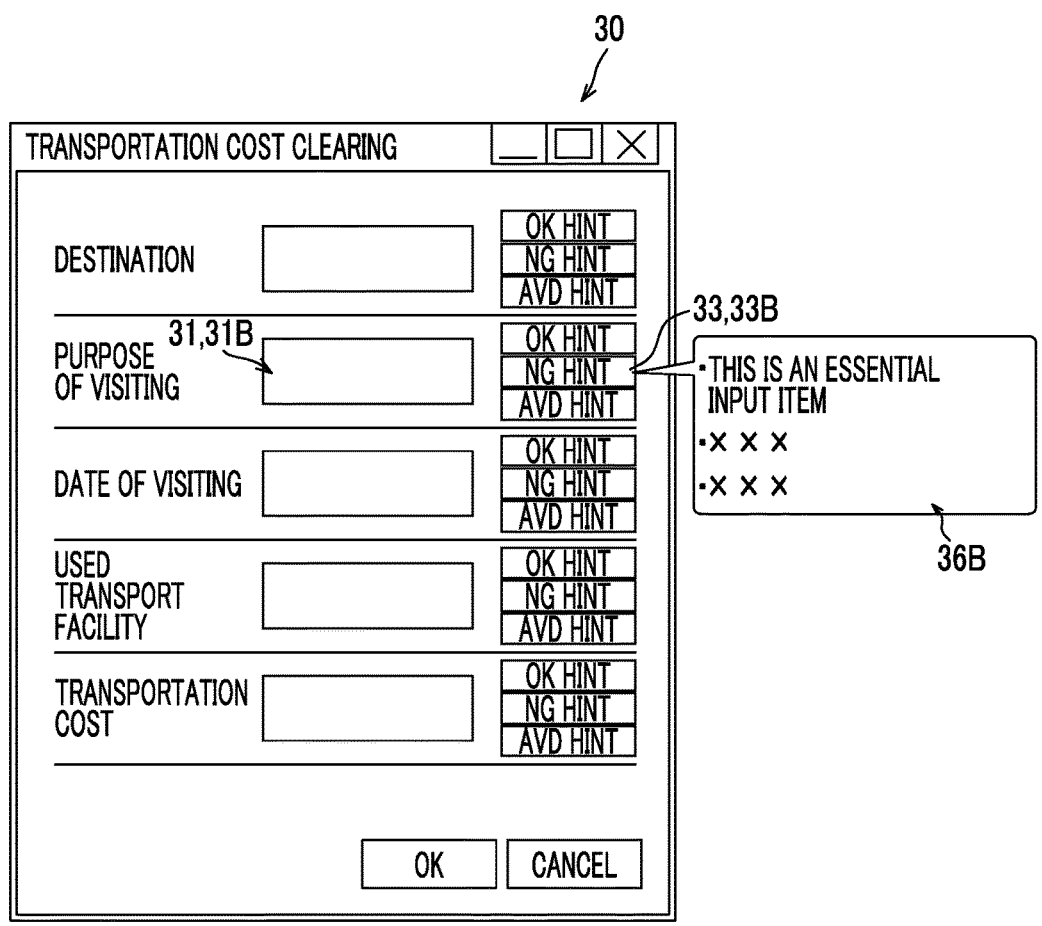
FIG. 2D is a diagram showing a state in which a character string indicating a specified problem (specified problem which is a basis of rejection) that the problem-specifying person B inputs for the person A inputting information is displayed as input guidance along with an information input field.

FIG. 2D is a diagram showing a state in which a character string indicating a specified problem (specified problem which is a basis of rejection) that the problem-specifying person B inputs for the person A inputting information is displayed as input guidance along with an information input field.

When the request for display of the information input fields, which configure new "transportation cost clearing", is received from the person A inputting information as described above, the information input system allows the person A inputting information to newly refer to a character string, which indicates a specified problem of "this is an essential input item" so that the problem-specifying person B newly inputs information with respect to the information input by the person A inputting information to the information input field for "destination", as a specified problem 36B which is a basis for rejection as shown in FIG. 2D.

As described above, the information input system according to an exemplary embodiment of the invention directs the person A inputting information to input such information by utilizing a character string indicating a problem specified in input information which was input by the person A inputting information themselves in the past and is accumulated during a business service flow of the person A inputting information.

Although a detailed description will be given later, the support of the person A inputting information to input such input information is performed not only by the character string indicating the problem specified in the input information that the person A inputting information themselves input in the past. If the person A inputting information belongs to a specific group, for example, character strings indicating problems specified in input information that other person inputting information in the group input in the past may be utilized.

Next, a detailed description will be given of a configuration example of the information input system according to an exemplary embodiment of the invention.

FIG. 4 is a block diagram showing a main configuration example of the information input system according to the exemplary embodiment of the invention. As shown in FIG. 4, the information input system 10 is provided with an information input field display unit 11, a specified problem input field display unit 12, a recording unit 14, and a guidance display unit 13.

In addition, a storage unit 17 shown in FIG. 4 may be provided in the information input system 10 or may be provided as an external device of which a detailed description will be given later.

The information input system 10 according to the exemplary embodiment of the invention may be connected to plural computer terminals (terminals 100 of person inputting information, terminals 200 of problem-specifying persons) via the Internet 300, for example. In a case where the aforementioned storage unit 17 is provided outside the information input system 10, the storage unit 17 may be connected to the information input system 10 via the Internet 300.

In addition, the information input system 10 may be provided with an operation selecting screen display unit 15 in a case of displaying an operation selection screen for receiving a request for display of at least one information input field which configures an operation.

Moreover, a transmission and receiving unit 16 shown in FIG. 4 is configured to transmit a signal for controlling a display device provided in each computer terminal (each of the terminal 100 of the persons inputting information and the terminal 200 of the problem-specifying persons), such as a display, to display information input fields, specified problem input fields, guidance, and the like via the Internet 300, for example, and receives various kinds of information input by each terminal (100, 200).

In addition, the information input field display unit 11, the specified problem input field display unit 12, and the guidance display unit 13, which are main components of the information input system 10, may be provided with a function of independently transmitting and receiving information to and from the outside.

Functions of the respective portions provided in the information input system 10 may be implemented by reading and executing a program stored on a computer readable information storage medium with a computer, which is provided with a control section such as a CPU, a storage section such as a memory, and an input and output section for transmitting and receiving data to and from external devices.

In addition, the program may be supplied to the information input system 10 such as a computer by using an information storage medium such as an optical disc, a magnetic disk, magnetic tape, a magnet-optical disc, or a flash memory or may be supplied to the information input system 10 via a data communication network such as the Internet.

Hereinafter, main configurations of the information input system 10 according to an exemplary embodiment of the invention will be individually described.

The following description will be given of an example in which the person A inputting information inputs information to the respective information input fields which configure the transportation cost clearing and the problem-specifying person B performs processing of approving and/or rejecting the input information. A specific example will be described with reference to FIGS. 1A, 2A to 2D, 3A, and 3B.

[Storage Unit]

The storage unit 17 stores information which is recorded by the recording unit 14. In addition, the storage unit 17 may be provided in the information input system 10 or may be provided as an external device.

The storage unit 17 may be implemented by a memory element such as a random access memory (RAM) or a read only memory (ROM), a hard disk, and the like. In addition, the storage unit 17 may store a program (software) to be executed by the information input system 10.

In addition, the storage unit 17 also operates as a work memory which stores various data items to be used during processing performed by the information input system 10. The various information items to be used during the processing performed by the information input system 10 include information recorded by the recording unit 14, for example.

In addition, the storage unit 17 may store the following information, in addition to the information recorded by the recording unit 14, as the information to be used during the processing performed by the information input system 10.

Here, an ID of a person inputting information for specifying each person inputting information who uses the information input system 10 may be determined in advance.

In addition, an operation selection screen ID may be determined in advance for specifying each screen when there are plural operation selecting screens 20 as screens for receiving selection of an operation, which is for inputting information to at least one information input field, from one person inputting information as shown in FIG. 1A described above. Moreover, an operation ID may be determined in advance for specifying each of the various operations selected by the person inputting information on the operation selecting screen 20.

For each of the information input fields 31, which configure the operation, as shown in FIG. 2A described above, an information input field ID for specifying each of the information input fields 31 may be determined in advance for each of the information input fields 31.

In addition, the information input field IDs, the operation electing screen IDs, the operation IDs, and the IDs of person inputting information for specifying the respective persons inputting information who use the information input system 10 may be stored in advance on the storage unit 17, for example.

Moreover, the IDs of person inputting information for the respective persons inputting information who use the information input system 10, which are stored in the storage unit 17, may be associated and stored with group IDs of groups to which the respective persons inputting information belong. In addition, the IDs of persons inputting information who use the information input system 10, which are stored in the storage unit 17, may be associated and stored with the group IDs for specifying the groups to which the respective persons inputting information belong and periods during which the persons inputting information belong to the groups.

The following description will be given on the assumption that an ID of a person inputting information: U0001 is determined in advance for the person A inputting information. In addition, it is assumed that W0002 is determined in advance as an operation ID for specifying an operation for "transportation cost clearing". Among the information input fields which configure the operation for "transportation cost clearing" shown in FIG. 2A as described above, an information input field ID: I1201 is determined in advance for the information input field 31A for "destination", an information input field ID: I1202 is determined in advance for the information input field 31B for "purpose of visiting", an information input field ID: I1203 is determined in advance for the information input field 31C for "date of visiting", an information input field ID: I1204 is determined in advance for the information input field 31D for "used transport facility", and an information input field ID: I1205 is determined in advance for the information input field 31E for "transportation cost".

FIG. 5 is a diagram showing an example of a table of person inputting information, in which the IDs of person inputting information for specifying the respective persons inputting information who use the information input system 10 are associated and recorded with the group IDs for specifying groups to which the respective persons inputting information belong.

Referring to FIG. 5, the storage unit 17 stores a table 90 of person inputting information, in which the ID: U0001 of a person inputting information as an ID of the person A inputting information who uses the information input system 10 is associated and recorded with the group ID: O011 as a group ID for specifying the group to which the person A inputting information belongs.

As described above, the storage unit 17 may store the table 90 of persons inputting information, in which the IDs of persons inputting information for specifying the respective persons inputting information who use the information input system 10 are associated and recorded with the group IDs for specifying the groups to which the persons inputting information belong as shown in FIG. 5.

Since a case where the problem-specifying persons A, B, and C are also person inputting information is assumed in FIG. 5, IDs of persons inputting information are provided to the respective problem-specifying persons A, B, and C. In addition, although the IDs of persons inputting information are different from problem-specifying person IDs in the example, the same IDs may be used.

Furthermore, when periods during which the persons inputting information belong to the groups are also associated and stored with the respective persons inputting information, group IDs for specifying groups to which the persons inputting information belonged in the past and periods during which the persons inputting information belonged to the groups may also associated and stored with the IDs of the persons inputting information in addition to the periods during which the persons inputting information belong the current groups though not shown in FIG. 5.

FIG. 6 is a diagram showing that there is a hierarchical organization structure indicating parent-child relationship between the respective groups to which the persons inputting information who use information input system 10 belong. FIG. 7 is a diagram showing an example of an organization table in which the group IDs for specifying the groups to which the respective persons inputting information who use the information input system 10 belong are associated and recorded with parent group IDs for specifying parent groups of the groups.

When the groups to which the respective persons inputting information who use the information input system 10 belong have a hierarchical structure as shown in FIG. 6, the storage unit 17 may store an organization table 100 in which the groups to which the respective persons inputting information who use the information input system 10 belong, the group IDs for specifying the groups, and parent group IDs for specifying parent groups of the groups are associated and recorded, as shown in FIG. 7.

Here, the information input system 10 may extract the respective IDs of persons inputting information for specifying the respective persons inputting information who belong to the groups specified by the group IDs by referring to the aforementioned table 90 of persons inputting information and the organization table 100. With such a configuration, the information input system 10 acquires information for categorizing the respective persons inputting information who use the information input system 10 into groups.

Referring to FIG. 5, the person A inputting information, for example, belongs to an "first intellectual property group" indicated by a group ID: O011. Referring to the organization table 100 in FIG. 7, a parent group (a group in an order which is higher by one stage) of the "first intellectual property group" is an "intellectual property department" indicated by a group ID: O010, and further, a parent group of the "intellectual property department" is a "legal department" indicated by a group ID: O001.

Therefore, it is possible to determine from the table of person inputting information in FIG. 5 and the organization table 100 in FIG. 7 that the person A inputting information belongs to the "first intellectual property group (group ID: O011)" in the "intellectual property department (group ID: O010)" included in the "legal department (group ID: O001)".

In addition, the information input system 10 may extract group members which are configured of the respective persons inputting information including the person A inputting information who belongs to the "first intellectual property group" indicated by the group ID: O011, by using the table 90 of person inputting information.

Referring to the organization table 100, "intellectual property department" indicated by the group ID: O010 is configured of the intellectual property first group (group ID: O011) and the intellectual property second group (group ID: O012). Therefore, the information input system 10 may categorize the members which are configured of the respective persons inputting information including the person A inputting information who belongs to "intellectual property department" indicated by the group ID: O010 by extracting the person inputting information who are associated and recorded with the intellectual property first group (organization ID: O011) or the intellectual property second group (organization ID: O012).

FIG. 8 is a diagram showing an example of an operation table in which the operation IDs for specifying operations of inputting information to at least one information input field are associated and recorded with the information input field IDs for specifying at least one information input field configuring the operations.

A specific description will be given. FIG. 8 shows an operation table 110 in which W1002 as an operation ID for specifying the operation for transportation cost clearing is associated with the information input field ID: I1201 (destination), the information input field ID: I1202 (purpose of visiting), the information input field ID: I1203 (date of visiting), the information input field ID: I1204 (used transport facility), and the information input field ID: I1205 (transportation cost) as information input field IDs for specifying the respective information input fields configuring the operation for transportation cost clearing.

The storage unit 17 may store the operation table 110 in which the operation IDs for specifying operations of inputting information to at least one information input field are associated and recorded with the information input field IDs for specifying each of the at least one information input field configuring the operations, as shown in FIG. 8.

FIG. 9 is a diagram showing an example of an operation selection screen table in which operation selecting screen IDs for specifying operation selecting screens configured to receive selection of an operation by the person inputting information are associated and recorded with operation IDs of at least one operation which configures the operation selecting screens.

A specific description will be given. FIG. 9 shows an operation selecting screen table 120 in which S0001 as an operation selection screen ID of the operation selecting screen which receives selection of an operation from a group of operations relating to accounting applications is associated and recorded with an operation selection ID: W1001 (accounting application), an operation selection ID: W1002 (transportation cost clearing), an operation selection ID: W1003 (lump-sum payment application), and an operation selection ID: W1004 (provisional payment application) as operation IDs configuring the operation selecting screen specified by the operation selecting screen ID: S0001.

The storage unit 17 may store the operation selecting screen table 120 in which the operation selecting screen IDs for specifying the operation selecting screens configured to receive selection of an operation from the person inputting information are associated and recorded with the respective operation IDs of at least one operation configuring the operation selecting screen, as shown in FIG. 9.

[Operation Selecting Screen Display Unit]

The operation selecting screen display unit 15 displays the operation selecting screen 20 configured to receive selection of an operation of inputting information to at least one information input field from the person inputting information, as shown in FIG. 1A.

The operation selecting screen display unit 15 may displays the operation selecting screen 20 when the person inputting information accesses the information input system 10, for example. When there are plural kinds of operation selecting screens, the operation selecting screen display unit 15 may display a predetermined operation selecting screen 20 which is selected by the person inputting information in response to selection of the operation selecting screen by the person inputting information.

In addition, the operation selecting screen display unit 15 may displays the operation selecting screen 20 configured to receive an operation of inputting information to at least one information input field from the person inputting information based on the operation selecting screen table, which is stored on the storage unit 17, for example, and in which the operation selecting screen IDs for specifying the operation selecting screens are associated and recorded with the respective operation IDs of the at least one operation configuring the operation selecting screens, when the person inputting information accesses the information input system 10.

A specific description will be given. For example, it is assumed that the storage unit 17 stores the operation selecting screen table 120, which is shown in FIG. 9, in which the operation selecting screen IDs for specifying the operation selecting screens 20 are associated and recorded with the respective operation IDs of at least one operation configuring the operation selecting screens.

If selection of an operation selection screen (operation selecting screen ID: S0001) relating to "accounting application" is received from the person inputting information, then the operation selecting screen display unit 15 displays an operation selection screen relating to the accounting application shown in FIG. 1A based on the operation selecting screen table 120, which is stored on the storage unit 17, and in which the operation selecting screen ID: S0001 for specifying the operation selecting screen 20 relating to "accounting application" is associated and recorded with the respective operation IDs (operation IDs: W1001 to W1004) of at least one operation which configures the operation selecting screen relating to "accounting application".

In addition, the recording unit 14 which will be described later may associate and record which of operations a person inputting information has selected on the operation selecting screen 20 being displayed by the operation selecting screen display unit 15 with the ID of the person inputting information for specifying the person inputting information.

In such a case, if a request for display of an operation selection screen is received from the person inputting information, the operation selecting screen display unit 15 may display the operation selecting screen based on the operation selecting screen table in which the operation selecting screen ID for specifying the operation selecting screen is associated and recorded with the respective operation IDs of at least one operations configuring the operation selecting screen and the operation selection history table in which the operation that the person inputting information has selected on the operation selecting screen is associated and recorded with the ID of the person inputting information for specifying the person inputting information.

FIG. 10 is a diagram showing an example of an operation selecting history table 60 indicating history information of operations which are recorded by the recording unit 14 and are selected by the respective persons inputting information on the respective operation selecting screens 20. Hereinafter, a specific description will be given of an example in which the operation selecting screen display unit 15 displays the operation selecting screen when the operation selecting history table 60 shown in FIG. 10 is stored on the storage unit 17.

First, when a request for display of the operation selecting screen (S0001) relating to an accounting application is received from the person A inputting information, the operation selecting screen display unit 15 determines operations, which configure the operation selecting screen (S0001) relating to the accounting application, based on the operation selecting screen table 120 in which the operation selecting screen ID: S0001 for specifying the operation selecting screen relating to "accounting application" is associated and recorded with each of one or more operation IDs (operation IDs: W1001 to W1004) configuring the operation selecting screen relating to "accounting application".

Next, the operation selecting screen display unit 15 statistically analyzes which of operations the person A inputting information has selected often on the operation selecting screen (S0001) relating to the accounting application, based on the selection history table 60.

Referring to the operation selecting history table 60 shown in FIG. 10, the information inputting person A (ID of person inputting information: U0001) has selected the operations for "transportation cost clearing (operation ID: W1002) and "cost application" (operation ID: W1001) often in this order on the operation selecting screen (operation selecting screen ID: S0001) relating to "accounting application".

Therefore, the operation selecting screen display unit analyzes that the person A inputting information has selected the operations for "transportation cost clearing (operation ID: W1002) and "cost application" (operation ID: W1001) often in this order on the operation selecting screen relating to "accounting application".

Then, the operation selecting screen display unit 15 displays, for the person A inputting information, the operation selecting screen 20 configured to receive selection of an operation by aligning the operations, which configure the operation selecting screen (S0001) relating to the accounting application, in the order from the operation which has been selected most often, based on the analysis result.

Figure 1B:
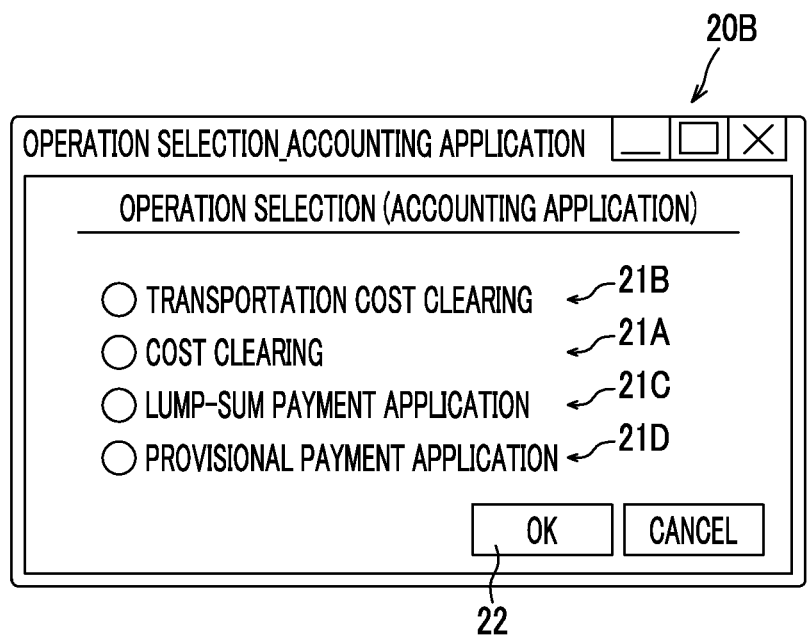
FIG. 1B is a diagram showing another example of the operation selecting screen which is displayed by the operation selecting screen display unit for receiving selection of an operation of inputting data to at least one information input field from a person A inputting information.

FIG. 1B is a diagram showing another example of the operation selecting screen which is displayed by the operation selecting screen display unit for receiving selection of an operation of inputting data to at least one information input field from a person A inputting information.

FIG. 1B shows that when the person A inputting information requests display of the operation selecting screen relating to "accounting application, the operation selecting screen display unit 15 displays, for the person A inputting information, an operation selecting screen 20B relating to "accounting application" by rearranging the operations (operations 21A to 21D), which configure the operation selecting screen relating to "accounting application" in the order from the operation which was selected most often in the past.

In addition, when the person A inputting information requests the display of the operation selecting screen relating to "accounting application", the operation selecting screen display unit 15 may not display operations, which have not been selected at all by the person A inputting information, among the operations configuring the operation selecting screen relating to "accounting application".

[Information Input Field Display Unit]

When a request for displaying information input fields is received from any one of the plural persons inputting information, the information input field display unit 11 displays the information input fields for inputting information for each of the plural persons inputting information.

Here, the request for displaying the information input fields from the person inputting information may be established by receiving selection of one operation performed on the aforementioned operation selecting screen 20, for example, from the person inputting information.

When the request for displaying the information input fields is received from the person inputting information via the operation selecting screen 20, the information input field display unit 11 may display the information input screen 30 based on the operation table in which an operation ID stored on the storage unit 17 for specifying an operation is associated and recorded with information input field IDs for specifying at least one information input field configuring the operation.

Hereinafter, a specific description will be given of an example in which the operation table 110 shown in FIG. 8 is stored on the storage unit 17. When selection of an operation (operation ID: W1002) for transportation cost clearing is received from the person inputting information, the information input field display unit 11 displays the information input screen 30 as a screen for displaying information input fields which configure the operation for "transportation cost clearing" shown in FIG. 2A, based on the operation table 110 in which the operation (operation ID: W1002) for the transportation cost clearing stored on the storage unit 17 is associated and recorded with information input field IDs (information input field IDs: I1201 to I1205) for specifying at least one information input field configuring the operation for "transportation cost clearing".

In addition, the recording unit 14 which will be described later may associate and record input information with information input field IDs for specifying the information input fields 31 to which the input information is input.

In such a case, when a request for displaying the information input screen 30 is received from the person inputting information, the information input field display unit 11 may display the information input screen 30 based on the operation table 110 in which an operation ID for specifying an operation is associated and recorded with information input field IDs for specifying at least one information input field configuring the operation and an input information recording table 50 in which input information that the person inputting information input in the past in the respective information input fields configuring the information input screen 30 is associated and recorded with the ID of the person inputting information for specifying the person inputting information.

FIG. 11 is a diagram showing an example of an input information recording table in which the recording unit associates and records input information with the respective information input field IDs for specifying information input fields with the input information input thereto. In addition, the business service IDs in FIG. 11 are identification IDs which are automatically provided every time the respective persons inputting information input some input information to the information input fields for an operation.

Hereinafter, a specific description will be given of an example in which the information input field display unit 11 displays an information input screen when the input information recording table 50 shown in FIG. 11 is stored on the storage unit 17.

Referring to FIG. 11, for example, the person A inputting information (ID of person inputting information: U0001) input "Null (blank)" as input information to "destination" (information input field ID: I1201) in the past on the information input screen for "transportation cost clearing".

Incidentally, when a specific person inputting information performs a specific operation (inputting of input information to information input fields), there is also an information input field to which input of "Null" (input of blank) is allowable in some cases, based on attribute of an organization or the like to which the specific person inputting information belongs, for example.

In such a case, it is preferable that the information input field display unit 11 does not display the information input field, to which the input of "Null" is allowable, on the information input screen when the information input field display unit 11 displays, for the specific person inputting information, the information input screen for performing the specific operation, for the purpose of avoiding an input error.

Therefore, the information input field display unit 11 mat acquire which of input information the person A inputting information who requests the display of the information input fields input on the information input screen, based on the input information recording table, and in a case where an information input field to which the person A inputting information input Null as input information is extracted, the information input field display unit 11 may display, for the person A inputting information, the information input screen for performing the operation without displaying the corresponding information input field.

A more specific description will be given. When the request for displaying the information input fields is received from the person A inputting information, the information input field display unit 11 searches for whether or not there is an information input field to which the person A inputting information input "Null" in one of the information input fields of the display request in the past, based on the association with the ID of the person inputting information for specifying the person A inputting information. If the information input field to which the person A inputting information input "Null" in the past is extracted, then the information input field display unit 11 may not display the information input field for the person A inputting information.

By not displaying such an information input field, which is considered not to be filled in, for the person inputting information, for example, by using the past information input history of the person inputting information in response to the request for displaying the information input fields from the person inputting information as described above, the input operations of the person inputting information are further supported.

[Specified Problem Input Field Display Unit]

The specified problem input field display unit 12 displays specified problem input fields for inputting character strings indicating problems specified in input information for a problem-specifying person who is different from the plural persons inputting information.

As described above, FIG. 3A is a diagram showing an example of a specified problem input screen which is displayed by the specified problem input field display unit 12 for displaying specified problem input fields where the problem-specifying person inputs character strings indicating problems specified in input information that the person A inputting information inputs.

The aforementioned problem-specifying person B is an approver who approves the input information that the person A inputting information inputs to the information input field, and the specified problem input field display unit 12 also displays, for an auditor C who audits the input information that the person A inputting information inputs to the information input fields as well as the problem-specifying person who is the approver, similar specified problem input fields for inputting character strings indicating problems specified in the input information.

The display of the specified problem input fields for inputting the character strings indicating problems specified in the input information may be performed for the problem-specifying person when the request for displaying the specified problem input fields is received from the problem-specifying person, or may be performed for the problem-specifying person when input of the input information to the information input fields is received from the person inputting information.

[Guidance Display Unit]

When input of character strings indicating problems specified in the input information which is input to the information input fields, the recording unit 14 which will be described later associates and records the character string information with the information input fields.

FIG. 12 is a diagram showing an example of a character string information recording table in which the recording unit associates and records character string information indicating specified problems with the respective information input fields with character strings input thereto for indicating the specified problems.

When a request for displaying information input fields is received from any of the plural persons inputting information, the guidance display unit 13 displays, as input guidance, at least one character string information item recorded by the recording unit 14, along with the information input fields.

Here if attribute information for specifying attribute of the problem-specifying person is provided to the problem-specifying person, the recording unit 14 may further associate and record the character string information with the attribute information, and the guidance display unit 13 may display, as input guidance, at least one character string information item, which is associated and recorded with predetermined attribute information, in the character string information recorded by the recording unit 14, along with the information input fields.

When attribute information for specifying attribute, such as an approver (a person who has approval authority for approving and/or rejecting input information that the person inputting information input) and an auditor (a person who has audit authority for auditing the input information that the person inputting information input) is provided to the respective problem-specifying persons, the guidance display unit 13 displays, as input guidance, at least one character string information item, which is associated and recorded with the attribute information, along with the information input fields.

Specifically, "NG hints (rejection hints)" are displayed along with the respective information input fields 31 on the information input screen 30 for displaying the information input fields, which is shown in FIG. 2A, and to which input information is input. In addition, "OK hints" and "Aud hints (audit hints)" are displayed along with the "NG hints" for some of the information input fields.

If the person A inputting information presses an "NG hint" button shown in FIG. 2A, a character string (specified problem which is a basis of rejection) indicating a specified problem, which was input by the problem-specifying person B as an approver with respect to input information input to the information input field corresponding to the pressed "NG hint" button by the person inputting information in the past may be displayed.

If the person A inputting information presses an "Aud hint" button, a character string (problem which is specified in audit) indicating a specified problem, which was input by the problem-specifying person C as an auditor with respect to input information input to the information input field corresponding to the pressed "Aud hint" button in the past may be displayed.

A method by which the guidance display unit 13 displays character strings indicating specified problem along with the information input fields for the person inputting information is not limited to the configuration shown in FIG. 2A, and a method of displaying character strings indicating specified problems in an aligned manner at positions adjacent to the information input fields on the information input screen is also applicable, for example.

Hereinafter, a description will be given of a method by which the guidance display unit 13 displays, as input guidance, character strings indicating specified problems along with the information input fields for the person A inputting information in response to a request for displaying the information input fields for transportation cost clearing (operation ID: 1002), which is received from the person A inputting information.

First, a description will be given of an "NG hint" which is a character string indicating a specified problem and is displayed along with the information input field 31B "purpose of visiting" on the information input screen shown in FIG. 2A.

For example, the recording unit 14 which will be described later may associate a result of processing (approval, rejection, or audit, for example) performed by the problem-specifying person with a processing ID or a business service ID and record the result by using a result flag.

FIG. 13 is a diagram showing an example of a processing history table, which is recorded by the recording unit, and in which results of processing performed by the respective problem-specifying persons are recorded. A case where the result flag for the processing (approval, rejection, or audit) is "1" in a processing history table 80 shown in FIG. 13 means that the processing has been performed. A case where the result flag is "0" means that the processing has not been performed.

When the information input system 10 receives a request for displaying the information input fields for transportation cost clearing (operation ID: 1002) is received from the person A inputting information, the guidance display unit 13 acquires the processing history table 80 which is stored on the storage unit 17 as will be described later and records result of processing performed by the respective problem-specifying persons recorded by the recording unit 12 as shown in FIG. 13.

Then, the guidance display unit 13 extracts a processing ID for specifying processing, a result flag of which means rejection of input of input information by the person A inputting information (ID of person inputting information: U0001), from the processing history table 80.

Referring to the processing history table 80 shown in FIG. 13, the processing specified by the processing ID: R0001 matches this condition. Therefore, the guidance display unit 13 extracts the processing with the processing ID: R0001, the result flag of which means rejection of the operation for the transportation cost clearing (operation ID: 1002) of the person A inputting information (ID of person inputting information: U0001).

Next, the guidance display unit 13 acquires a character string information recording table 70, which is recorded by the recording unit 14, and in which character string information indicating specified problem is associated and recorded with the respective information input fields with the character strings input thereto, as shown in FIG. 12.

Then, the guidance display unit 13 searches which of the information input fields the character string information indicating the specified problem associated and recorded with the processing ID: R0001 is input to.

Referring to FIG. 12, the character string information indicating the specified problem which is associated and recorded with the processing ID: R0001 is a character string indicating the specified problem which is input with respect to the information field "purpose of visiting" specified by the information input field ID: I1202. In such a case, the guidance display unit 13 extracts text information "this is an essential input item" as character string information indicating the specified problem which is associated and recorded with the ID: U0001 of the person inputting information for specifying the person A inputting information and the information input field ID of the information input field for "purpose of visiting" specified by the information input field ID: I1202 in the operation for the transportation cost clearing.

Then, the guidance display unit 13 displays, as input guidance, the character string indicating the specified problem "this is an essential input item" along with the information input field 31B for "purpose of visiting" for the person A inputting information.

Similarly, the guidance display unit 13 displays, as input guidance, a character string indicating a specified problem "this should be based on the western calendar" along with the information input field 31C for "date of visiting" for the person A inputting information.

As described above, when the request for displaying the information input screen is received from the person inputting information, the guidance display unit 13 extracts, from the storage unit 17, the character string information indicating the specified problem which is input by a problem-specifying person (an approver, an auditor, or the like) who is different from the person inputting information with respect to the input information that the person inputting information input to the information input field in the past, and displays the character string indicating the specified problem as input guidance along with the information input field.

In addition, when the storage unit 17 has information recorded in such a manner that the group IDs for specifying groups to which the persons inputting information who use the information input system 10 belong are associated with the parent group IDs for specifying parent groups of the group, and the request for displaying the information input fields is received from a person inputting information, the guidance display unit 13 may display, as input guidance, a character string indicating a specified problem input with respect to input information that other person inputting information in the group, to which the person inputting information belongs at the time of the request for displaying the information input fields, input to the information input field, along with the information input field for the person inputting information.

In addition, when the request for displaying the information input fields is received from a person inputting information, the guidance display unit 13 may display, as input guidance, a character string indicating a specified problem input with respect to input information that other person inputting information in the parent group of the group, to which the person inputting information belongs at the time of the request for displaying the information input fields, input to the information input field, along with the information input field for the person inputting information.

Furthermore, when the request for displaying the information input fields is received from a person inputting information, the guidance display unit 13 may display, as input guidance, a character string indicating a specified problem input with respect to input information that other person inputting information in a further parent group of the parent group of the group, to which the person inputting information belongs at the time of the request for displaying the information input fields, input to the information input field, along with the information input field for the person inputting information.

Next, a description will be given of an "Aud hint" as a character string indicating a specified problem which is displayed with the information input field 31D for "used transport facility" on the information input screen shown in FIG. 2A for the person A inputting information.

When the information input system 10 receives the request for displaying the information input fields for the transportation cost clearing from the person A inputting information, the guidance display unit 13 acquires the processing history table 80, which is stored on the storage unit 17, for example, in which results of processing performed by the respective problem-specifying persons recorded in the recording unit 12 are recorded, as shown in FIG. 13.

Then, the guidance display unit 13 extracts a processing ID for specifying processing, a result flag of which means audit of the input of the input information of the person A inputting information (ID of person inputting information: U0001) in the processing history table 80.

Referring to the processing history table 80 shown in FIG. 13, the processing specified by the processing ID: R0007 matches this condition. Therefore, the guidance display unit 13 extracts the processing with the processing ID: R0007, the result flag of which means audit of the operation of the person A inputting information (ID of person inputting information: U0001).

Next, the guidance display unit 13 acquires the character string information recording table 70, which is recorded by the recording unit 14, and in which the processing IDs, the character string information indicating specified problems, and the information input field with the character strings input thereto are associated and recorded, as shown in FIG. 12.

Then, the guidance display unit 13 searches for which of the information input fields the character string information indicating the specified problem associated and recorded with the processing ID: R0007 is input to.

Referring to FIG. 12, the character string information indicating the specified problem associated and recorded with the processing ID: R0007 is a character string indicating the specified problem which is input with respect to the information input field for "used transport facility" specified by the information input field ID: I1204. In such a case, the guidance display unit 13 extracts text information "name of transportation facility should be described with from where to where you used it" as the character string information indicating the specified problem which is associated and recorded with the ID: U0001 of the person inputting information for specifying the person A inputting information and the information input field ID of the information input field for "used transport facility" specified by the information input field ID: I1204 in the operation for the transportation cost clearing.

Then, the guidance display unit 13 displays, as input guidance, the character string indicating the specified problem "name of transportation facility should be described with from where to where you used it" along with the information input field 31D for "used transport facility" for the person A inputting information.

As described above, when the request for displaying the information input screen is received from the person inputting information, the guidance display unit 13 may extract, from the storage unit 17, the character string information indicating the specified problem which was input by a problem-specifying person (an approver, an auditor, or the like) who is different from the person inputting information with respect to the input information that the person inputting information input to the information input field in the past, and display the character string indicating the specified problem as input guidance along with the information input field.

As described above, the guidance display unit 13 displays, as input guidance, the character string indicating the specified problem that the problem-specifying person (an approver or an auditor, for example) inputs with respect to the input information of the person inputting information every time the person inputting information inputs information to the information input field.

In addition, when the request for displaying the information input screen is received from a person inputting information, the guidance display unit 13 may display, as input guidance a character string indicating a specified problem input by the auditor with respect to input information that "other person inputting information in the group to which the person inputting information belongs at the time of the request for displaying the information input fields", "other person inputting information in a parent group of the group to which the person inputting information belongs at the time of the request for displaying the information input fields", or "other person inputting information in a further parent group of the parent group of the group to which the person inputting information belongs to at the time of the request for displaying the information input fields" input to the information input field, for the person inputting information.

[Recording Unit]

The recording unit 14 may associate and record input information which is input to the information input fields displayed by the information input field display unit 11 with the information input fields with the information input thereto.

For example, it is assumed that the person A inputting information input "Examiner OO of Patent Office" to the information input field 31A for inputting "destination", remained the information input field 31B for inputting "purpose of visiting" to be blank, which is therefore filled with "Null", input "Jan. 7, 2013" to the information input field 31 for inputting "date of visiting", input "subway" to the information input field 31D for inputting "used transport facility", and input "190 (JPY)" to the information input field 31E for inputting "transportation cost" as shown in FIG. 2C on the information input screen 30 shown in FIG. 2A.

FIG. 11 is a diagram showing an example of an input information recording table in which the recording unit associates and records input information with the respective information input field IDs for specifying information input fields with the input information input thereto;

Referring to the input information recording table 50 shown in FIG. 11, the recording unit 14 associates and records an operation year, month, and date when the person inputting information performs the operation for "transportation cost clearing", a business service ID which is provided every time the person A inputting information performs an operation, an ID of the person inputting information for specifying the person A inputting information, an operation ID for specifying that the operation selected by the person A inputting information on the operation selecting screen is "transformation cost clearing", and an information input field ID for specifying each of the information input fields which configure the operation for "transportation cost clearing".

In addition, the business service ID in FIG. 11 is an identification ID which is sequentially and automatically provided every time the respective persons inputting information perform operations of inputting some input information to the information input field. In addition, the recording unit 14 associates and records the input information, which is input to the information input fields specified by the information input field IDs, with the information input field IDs.

When the request for displaying the information input screen 30 for performing an operation of inputting some input information to at least one information input field from each person inputting information is established by receiving selection of the operation from each person inputting information by using the operation selecting screen 20 as shown in FIG. 1A, for example, the recording unit 14 may store the information which of operations each person inputting information selects on the operation selecting screen 20 as well as the input information.

FIG. 10 is a diagram showing an example of an operation selecting history table which is recorded by the recording unit and indicates history information of operations selected by the respective persons inputting information on the respective operation selecting screens.

As shown in FIG. 10, the recording unit 14 may associate and record which of operations a person inputting information selects on the operation selecting screen 20 displayed by the operation selecting screen display unit 15 with the ID of the person inputting information for specifying the person inputting information.

Specifically, the recording unit 14 associates and records operation year, month, and date when the person A inputting information performs an operation for "transportation cost clearing" or the like, the ID of the person inputting information for specifying the person A inputting information, and the operation ID for specifying the operation for "transportation cost clearing" or the like that the person A inputting information selects on the operation selecting screen, as shown in FIG. 10.

In addition, when input of a character string to a specified problem input field which is displayed for the problem-specifying person by the specified problem input field display unit 12 is received from the problem-specifying person, the recording unit 14 associates and records the character string information with the information input field.

For example, it is assumed that the problem-specifying person B input "this is an essential input item" with respect to the input information "Null" that the person A inputting information input to the information input field 31B for "purpose of visiting" and input "this should be based on the western calendar" with respect to input information "Jan. 7, 2013" that the person A inputting information input to the information input field 31C for "date of visiting" as shown in FIG. 3B on the specified problem input screen 40 shown in FIG. 3A.

When the information input system 10 receives the input of the character strings indicating the problems specified by the problem-specifying person B, the recording unit 14 records the character string information indicating the specified problems input by the problem-specifying person B.

In addition, it is assumed that the problem-specifying person ID of the problem-specifying person B as an approver is determined to be U1002 in advance, and the problem-specifying ID of the problem-specifying person C as an auditor is determined to be U2003 in advance.

FIG. 12 is a diagram showing an example of a character string information recording table, which is recorded by the recording unit, in which character string information indicating specified problems is associated and recorded with the respective information input fields with character strings input thereto for indicating the specified problems.

Referring to the character string information recording table 70 shown in FIG. 12, the recording unit 14 associates and records processing year, month, and date when the problem-specifying person B performs processing (approval/rejection) on the operation for "transportation cost clearing" by the person A inputting information, a processing ID which is provided every time the problem-specifying person B performs processing, the problem-specifying person ID for specifying the problem-specifying person B, a business service ID for specifying a processing target that the problem-specifying person B performs, the ID of the person inputting information for specifying that the person inputting information who performs the operation (transportation cost clearing) specified by the business service ID is the person A inputting information, and the fact that information input fields in which the problem-specifying person B specifically specifies problems among the information input fields 31 that the person A inputting information inputs are the information input field 31B for "purpose of visiting" (information input field ID: 1202) and the information input field 31C for "data of visiting" (information input field ID: 1203).

As shown in FIG. 12, the recording unit 14 associates and records the character string information indicating the specified problem "this is an essential input item" input by the problem-specifying person B with the business service ID: T0001 and the information input field ID: I1202, and associates and records the character string information indicating the specified problem "this should be based on the western calendar" input by the problem-specifying person B with the business service ID: T0001 and the information input field ID: I1203.

In addition, the processing IDs in the character string information recording table 70 shown in FIG. 12 is identification IDs which are sequentially and automatically provided every time the respective problem-specifying persons perform processing (approval, rejection, or audit, for example) on the operations that the respective persons inputting information perform operations of inputting some input information to the information input fields.

It is possible to know from FIG. 12 that the recording unit 14 associates and records the business service ID: T0007 and the information input field ID: I1204 with the character string information indicating the specified problem "name of transportation facility should be described with from where to where you used it" input by the problem-specifying person C who is an auditor.

As described above, the recording unit 14 associates and records not only the character string information indicating the specified problem input by the approver among the problem-specifying persons but also the character string information indicating the specified problem in put by the auditor who is also a problem-specifying person with the business service ID and the information input field ID.

When attribute information for specifying attribute of the problem-specifying person is provided to the problem-specifying person and the attribute information is stored on the storage unit 17, the recording unit 14 may further associate and record the character string information with the attribute information. When the attribute of the problem-specifying person is specified by the problem-specifying person ID, the character string information may be further associated and recorded by associating and recording the character string information with the problem-specifying person ID for specifying the problem-specifying person who inputs the character string information.

In addition, the recording unit 14 may further associate and record group information for specifying a group, to which the person inputting information belongs at the time of inputting the input information to the information input field 31 displayed by the information input field display unit 11, with the character string information.

By associating and recording the group information for specifying the group to which the person inputting information belong at the time of inputting the input information to the information input field 31 with the character string information as described above, an appropriate character string indicating a specified problem is displayed as input guidance even in a case where the person inputting information moves to another group.

FIG. 13 is a diagram showing an example of a processing history table, which is recorded by the recording unit, in which results of processing performed by the respective problem-specifying persons are recorded;

In addition, the recording unit 14 may associate result of processing performed by the problem-specifying person with the processing ID or the business service ID and the operation ID and record the results by using result flags, for example, as in the processing history table 80 shown in FIG. 13.

A specific description will be given. The recording unit 14 may associate and record an "approval" flag "1" among the result flags with the processing ID in a case where a result of processing specified by the processing ID is "approved". In a case where the result of the processing specified by the processing ID is not "approved", the recording unit 14 associates and records an "approval" flag "0" among the result flags with the processing ID.

In addition, the recording unit 14 may associate and record a "rejection" flag "1" among the result flags with the processing ID in a case where the result of the processing specified by the processing ID is "rejected". In a case where the result of the processing specified by the processing ID is not "rejected", the recording unit 14 associates and records the "rejection" flag "0" among the result flags with the processing ID.

In addition, the recording unit 14 may associate and record an "audit" flag "1" among the result flags with the business service ID in a case where audit is performed on the business service specified by the business service ID. In a case where the audit is not performed on the business service specified by the business service ID, an "audit" flag "0" among the result flags is associated and recorded with the business service ID.

[Transmission and Receiving Unit]

The information input system 10 according to an exemplary embodiment of the invention may be provided with the transmission and receiving unit 16 which transmits a signal for controlling a display device provided in each computer terminal, such as a display, that the person inputting information and the problem-specifying person (an approver or an auditor, for example) uses to display information input fields, specified problem input fields, guidance, and the like and receives various kinds of information input by each terminal (100, 200) in addition to the aforementioned configurations.

In a case where the aforementioned storage unit 17 is provided outside the information input system 10, the transmission and receiving unit 16 may receive various kinds of information transmitted from the storage unit 17 in response to a request for acquiring various kinds of information stored on the storage unit 17, which is sent from the information input system 10. In addition, the transmission and receiving unit may transmit the aforementioned character string information, the input information, and the like recorded by the recording unit 14 to the storage unit 17.

Various configurations provided in the information input system 10 according to the exemplary embodiment of the invention are described hitherto. Next, a description will be given of various kinds of processing performed by the information input system 10 according to the exemplary embodiment of the invention with reference to flowcharts.

First, a description will be given of processing of displaying an operation selection screen by the information input system 10 according to the exemplary embodiment of the invention in a case where the information input system 10 is provided with the operation selecting screen display unit 15.

Figure 14:
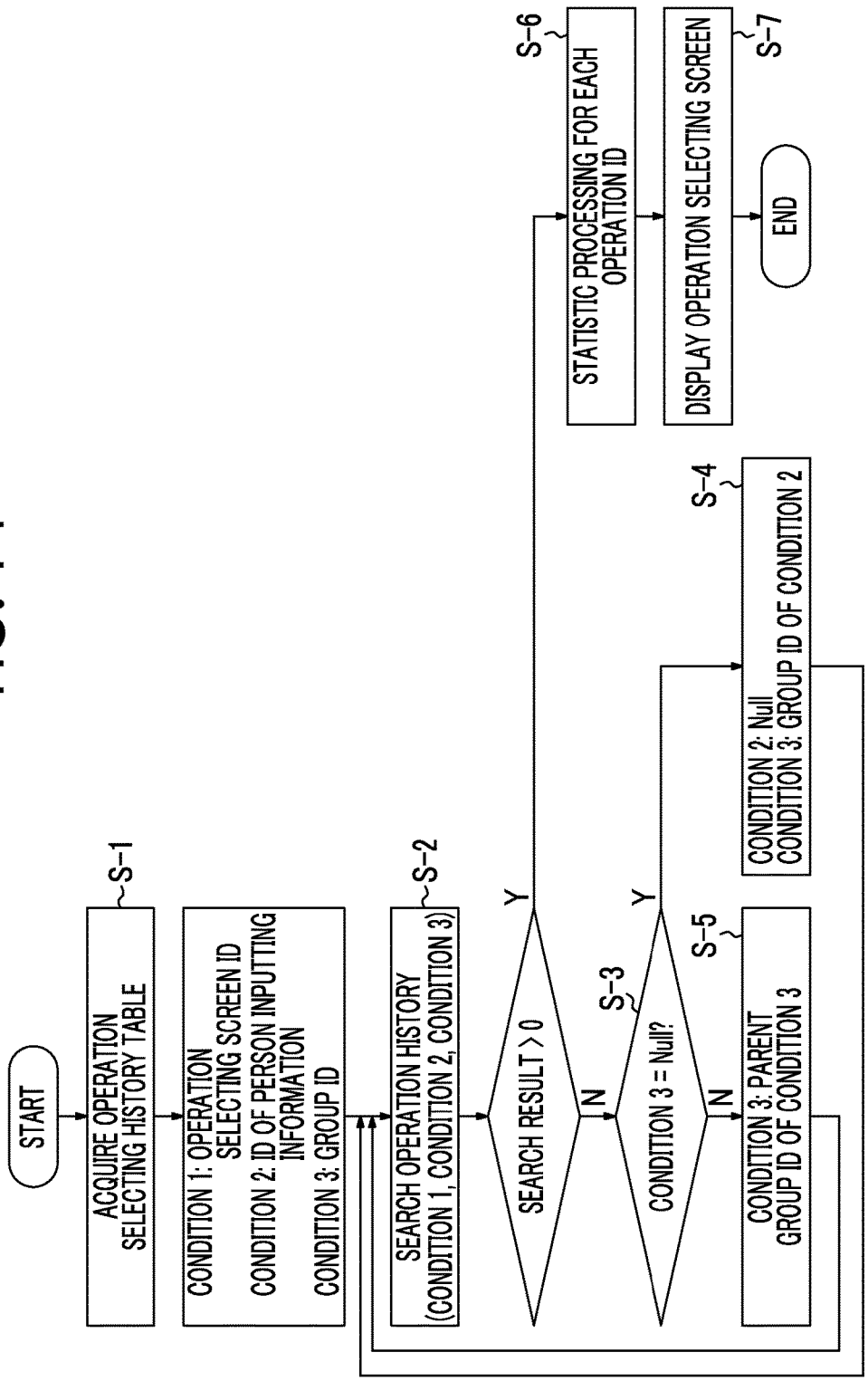
FIG. 14 is a flowchart showing an example of processing by the information input system according to an exemplary embodiment of the invention displaying an operation selecting screen.

FIG. 14 is a flowchart showing an example of processing by the information input system according to an exemplary embodiment of the invention displaying an operation selection screen.

If a person inputting information accesses the information input system 10 via the Internet 300 or the like, the information input system 10 starts display of the operation selecting screen.

The information input system 10 acquires an operation selecting history table as shown in FIG. 10, which is history information of operations selected on the operation selecting screen, the display of which is requested by the person inputting information (S-1).

Then, whether or not a history of a selection of an operation, which matches conditions (1): the operation selecting ID requested by the person inputting information, (2): the ID of the person inputting information, and (3) a group ID, in the input field of which Null is input, and which was performed in the past on the operation selecting screen requested by the person inputting information, is present from the acquired operation selecting history table (S-2).

In the case where it is not possible to find any history which matches the conditions as a result of the search in Process S-2, it may be determined whether or not the input field of the group ID is Null in relation to the condition (3) (S-3). If the input field of the group ID is Null in relation to the condition (3), the information input system 10 may perform searching under conditions (1): the operation selecting ID requested by the person inputting information, (2): the ID of the person inputting information, the input field of which is Null, and (3) the group ID for specifying the group of the ID of the person inputting information, with reference to the table of person inputting information in which information about the person inputting information who use the information input system 10 is recorded, as shown in FIG. 5 (S-4).

That is, the information input system 10 may search for whether or not the person inputting information associated and recorded with the group ID for specifying the group of the ID of the person inputting information has selected the operation in the past on the operation selecting screen requested by the person inputting information.

If the input field of the group ID is not Null in relation to the condition (3), the information input system 10 may perform searching under conditions (1): the operation selecting screen ID requested by the person inputting information, (2): the group ID, the input field of which is Null, of the group of the person inputting information, and (3) the ID of the person inputting information for specifying the person inputting information who is associated and recorded with the group ID for specifying the parent group of the group to which the ID of the person inputting information belongs, with reference to the table of person inputting information in which information about the person inputting information who use the information input system 10 is recorded, as shown in FIG. 5 (S-5).

That is, whether or not the person inputting information associated and recorded with the group ID for specifying the parent group of the group to which the ID of the person inputting information belongs has selected the operation in the past on the operation selecting screen requested by the person inputting information.

The information input system 10 may perform statistic processing separately for each operation ID when the information input system 10 may find a history which matches the search conditions after repeating the aforementioned Processes S-2 to S-5 (S-6). In the statistic processing, which of operations has been selected often on the operation selecting screen requested by the person inputting information, for example, is statistically found.

The information input system 10 may display the operation selecting screen requested by the information input person based on the result of the statistic processing, which is obtained in Process S-5, and the information recorded in such a manner that the operation selecting screen ID for specifying the operation selecting screen requested by the person inputting information with the respective operation IDs of at least one operation configuring the operation selecting screen, as shown in FIG. 9 (S-7).

Next, a description will be given of processing by the information input system 10 according to the exemplary embodiment of the invention displaying an information input screen when a request for displaying the information input fields is received from any one of the plural persons inputting information.

Figure 15:
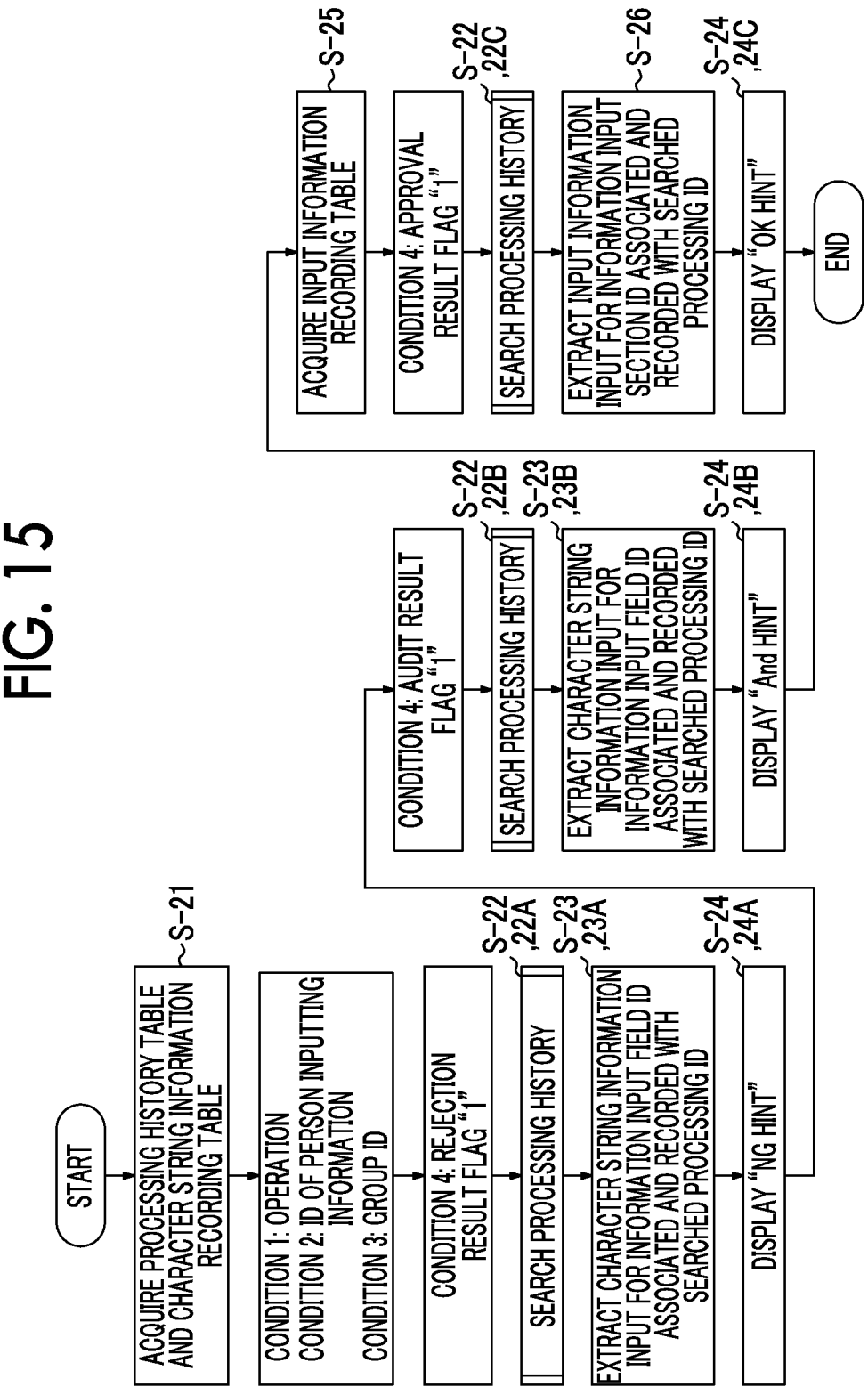
FIG. 15 is a flowchart showing an example of processing by the information input system according to an exemplary embodiment of the invention displaying input guidance along with the information input field.
Figure 16:
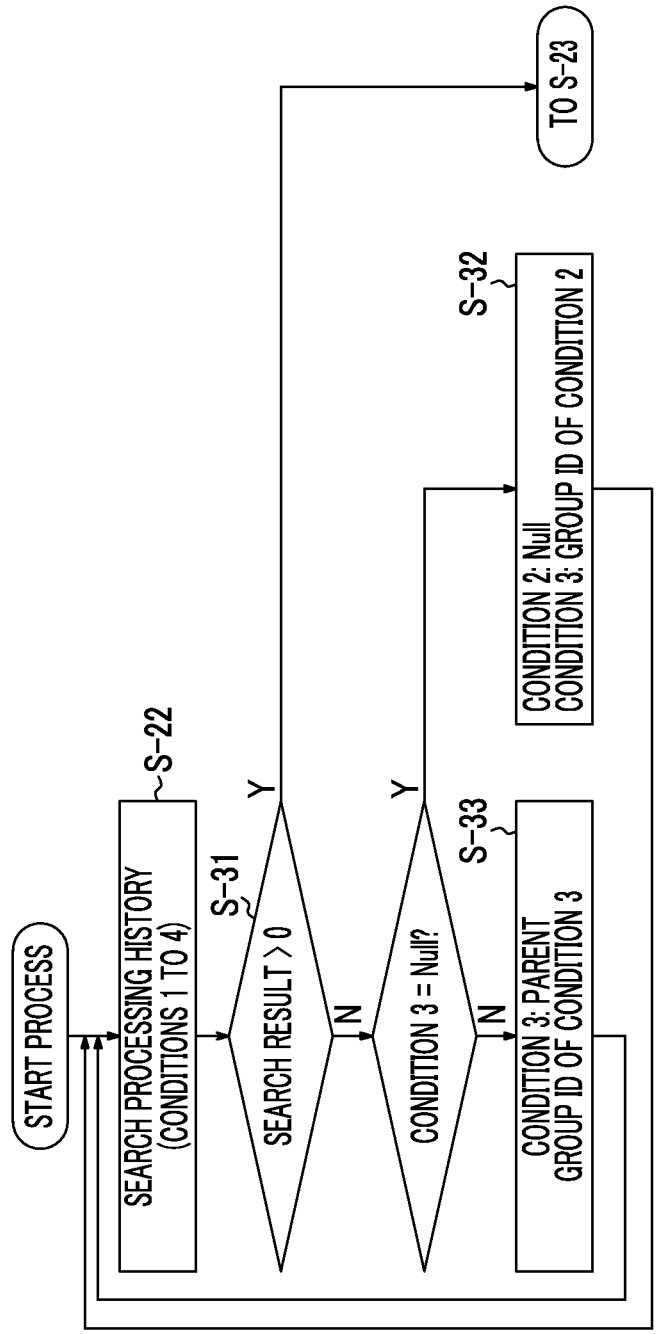
FIG. 16 is a sub-flowchart illustrating details of Process S-22 shown in FIG. 15.

FIG. 15 is a flowchart showing an example of processing by the information input system according to the exemplary embodiment of the invention displaying input guidance along with the information input field. FIG. 16 is a sub-flowchart illustrating a detail of Process S-22 shown in FIG. 15.

The information input system 10 acquires the processing history table as shown in FIG. 13 and the character string information recording table as shown in FIG. 12 (S-21).

Then, whether or not there was a processing history (rejection history) in the operations requested by the person inputting information in the past is searched under conditions (1): the operation ID for specifying the operation requested by the person inputting information, (2): the ID of the person inputting information, (3): the group ID of the group to which the person inputting information belongs, and (4): a rejection result flag "1" in the processing history table (S-22, S-22A).

If it is not possible to find any history which matches the conditions as a result of the searching in Process S-22A, it is determined that the input field of the group ID is Null in relation to the condition (3) (S-31). If the input field of the group ID is Null in relation to the condition (3), the information input system 10 may perform searching under conditions (1): the operation ID for specifying the operation requested by the person inputting information, (2): the ID of the person inputting information, the input field of which is Null, (3): the group ID of the group to which the person inputting information belongs, and (4): a rejection result flag "1" with reference to the table of person inputting information, in which information about the person inputting information who use the information input system 10 is recorded, as shown in FIG. 5 (S-32).

That is, the information input system 10 may search for whether or not there was a rejection history in the operations requested by the person inputting information, in the history of the person inputting information who is associated and recorded with the group ID for specifying the group of the ID of the person inputting information, in the past.

If the input field of the group ID is not Null in relation to the condition (3), the information input system 10 may perform searching under conditions (1): the operation ID for specifying the operation requested by the person inputting information, (2): the ID of the person inputting information, the input field of which is Null, (3): the ID of the person inputting information for specifying the person inputting information associated and recorded with the group ID for specifying the parent group of the group to which the ID of the person inputting information belongs, and (4): a rejection result flag "1" with reference to the table of person inputting information, in which information about the person inputting information who use the information input system 10 is recorded, as shown in FIG. 5 (S-33).

That is, the information input system 10 may search for whether or not there is a result of rejection in the past for other person inputting information who configure the parent group of the group, to which the person inputting information belong, in relation to the operation requested by the person inputting information.

If the information input system 10 may find a history which matches the search condition by repeating the Processes S-22, S-31, S-32, and S-33, the information input system 10 extracts character string information indicating a specified problem input to the information input field ID with the information input field ID associated and recorded with rejected processing ID (S-23, 23A), and displays the extracted input information as an "NG hint" along with the information input field specified by the information input field ID (S-24, 24A).

Then, whether or not there is a history of audit processing performed on the operation requested by the person inputting information is searched for under conditions: (1) the operation ID for specifying the operation requested by the person inputting information, (2): the ID of the person inputting information, (3): the ID of the person inputting information, the input field of which is Null, and (4): the audit result flag "1" in the processing history table (S-22, S-22B).

If it is not possible to find any history which matches the conditions as a result of the searching in Process S-22B, it is determined whether or not the input field of the group ID is Null in relation to the condition (3) (S-31). If the group ID of the group to which the person inputting information belongs is Null in relation to the condition (3), the information input system 10 may perform searching under conditions (1): the operation ID for specifying the operation requested by the person inputting information, (2): the ID of the person inputting information, the input field of which is Null, (3): the group ID for specifying the group to which the ID of the person inputting information belongs, and (4): an audit result flag "1" with reference to the table of person inputting information, in which information about the person inputting information who use the information input system 10 is recorded, as shown in FIG. 5 (S-32).

That is, the information input system 10 may search for whether or not there was a history of audit processing performed on the operation requested by the person inputting information, in the history of the person inputting information who is associated and recorded with the group ID for specifying the group, to which the ID of the person inputting information belongs, in the past.

If the input field of the group ID of the group to which the person inputting information belongs is not Null in relation to the condition (3), the information input system 10 may perform searching under conditions (1): the operation ID for specifying the operation requested by the person inputting information, (2): the ID of the person inputting information, the input field of which is Null, (3) the ID of the person inputting information for specifying the person inputting information who is associated and recorded with the group ID for specifying the parent group of the group to which the ID of the person inputting information belongs, and (4): an audit result flag "1" with reference to the table of person inputting information, in which information about the person inputting information who use the information input system 10 is recorded, as shown in FIG. 5 (S-33).

That is, the information input system 10 may search for whether or not there was a result of audit processing performed in the past for other person inputting information configuring the parent group of the group, to which the person inputting information belongs, in relation to the operation requested by the person inputting information.

If the information input system 10 may find a history which matches the search conditions by repeating Process S-22, S-31, S-32, and S-33, the information input system 10 extracts character string information indicating a specified problem which is input with respect to the information input field ID associated and recorded with the processing ID of the processing as a target of the audit (S-23, 23B), and displays an "Aud hint" along with the information input field specified by the information input field ID (S-24, 24B).

Then, whether or not there was a history of approval processing performed on the operation requested by the person inputting information in the past may be searched for under conditions (1): the operation ID for specifying the operation requested by the person inputting information, (2): the ID of the person inputting information, (3): the group ID of the group of the person inputting information, the input field of which is Null, and (4): an approval result flag "1" and an audit result flag "0" in the processing history table (S-22, S-22C).

Here, the information input system 10 may acquire the input information recording table prior to Processes S-22 and 22C (S-25).

If it is not possible to find any history which matches the search condition as a result of the searching in Process S-22, it is determined whether or not the input fields of the group ID of the group to which the person inputting information belongs is Null in relation to the condition (3) (S-31). If the input field of the group ID of the group to which the person inputting information belongs is Null in relation to the condition (3), the information input system 10 may perform searching under conditions (1): the operation ID for specifying the operation requested by the person inputting information, (2): the ID of the person inputting information, the input field of which is Null, (3) the group ID for specifying the group of to which the ID of the person inputting information belongs, and (4): an approval result flag "1" with reference to the table of person inputting information, in which information about the person inputting information who use the information input system 10 is recorded, as shown in FIG. 5 (S-32).

That is, the information input system 10 may search for whether or not there was a history of approval processing performed in the past on the operation requested by the person inputting information, in the history of the person inputting information who is associated and recorded with the organization ID for specifying the organization to which the ID of the person inputting information belongs.

If the input field of the group ID of the group to which the person inputting information belongs is not Null in relation to the condition (3), the information input system 10 may perform searching under conditions (1): the operation ID for specifying the operation requested by the person inputting information, (2): the ID of the person inputting information, the input field of which is Null, (3): the ID of the person inputting information for specifying the person inputting information associated and recorded with the organization ID for specifying the parent organization of the organization to which the ID of the person inputting information belongs, and (4): an approval result flag "1" with reference to the table of person inputting information, in which information about the person inputting information who use the information input system 10 is recorded, as shown in FIG. 5 (S-33).

That is, the information input system 10 may search for whether or not there was a result of approval processing in the past for other person inputting information who configure the parent group of the group, to which the person inputting information belong, in relation to the operation requested by the person inputting information.

If the information input system 10 may find a history which matches the search conditions by repeating Process S-22, S-31, S-32, and S-33, the recording unit 14 may extract the input information input to the information input field with the information input field ID associated and recorded with the processing ID of the target of approval with reference to the input information recording table, in which the input information is associated and recorded with the information input fields with the input information input thereto (S-26) as shown in FIG. 11, and display an "OK hint" along with the information input field specified by the information input field ID (S-24, 24C).

In addition, the information input system. 10 may perform statistic processing about which of operations has been selected least often on the information input screen requested by the person inputting information, with reference to the input information recording table, which is recorded by the recording unit 14, and in which the input information is associated and recorded with the respective information input fields with the input information input thereto, as shown in FIG. 11.

If the information input system 10 searches for a specific information input field, to which input information has never been input in the past operation by the person inputting information, and the approval result flag of which is "1" as a result of the statistic processing in Process S-24, the information input system 10 may determine not to display the specific information input field on the information input screen (S-24).

The information input system 10 described above is an information input system which directs a person inputting information to input some input information by using information from a problem-specifying person who specifies a problem in the input information input to an information input field, when the person inputting information inputs the input information to the information input field.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information input system comprising:
at least one hardware processor configured to implement:
an information input field display section that displays an information input field for inputting information for each of a plurality of persons inputting information;
a specified problem input field display section that displays a specified problem input field for inputting a character string indicating a specified problem with respect to the input information for a problem-specifying person who is different from the plurality of persons inputting information, wherein the specified problem input field display section is configured to receive the character string in the specified problem input field of a user interface in a same window also displaying previously input information in the information input field;
a recording section that associates and records character string information with the information input field in response to an input of the character string being received from the problem-specifying person; and
a guidance display section that controls display, as input guidance, of at least one character string information item, which is recorded by the recording section, along with the information input field, in response to a request for display of the information input field being received from any one of the plurality of persons inputting information,
wherein the specified problem input field display section displays the specified problem input field side by side with the previously input information in the same window.

2. The information input system according to claim 1, wherein in response to attribute information for specifying attributes of the problem-specifying person being provided to the problem-specifying person,
the recording section further associates and records the character string information with the attribute information, and
the guidance display section displays, as the input guidance, at least one character string information item, which is associated and recorded with the attribute information determined in advance, in the character string information, which is recorded by the recording section, along with the information input field.

3. The information input system according to claim 2, wherein in response to group information for specifying a group to which each of the plurality of persons inputting information belong being provided to each of the persons inputting information,
the recording section further associates and records the character string information with the group information for specifying a group to which the person inputting information in the information input field displayed by the information input field display section belongs at the time of the input.

4. The information input system according to claim 3, wherein in response to a request for display of the information input field being received from one of the plurality of persons inputting information,
the guidance display section extracts at least one character string information item which is associated and recorded, by the recording section, with group information for specifying a group to which the one of the plurality of persons inputting information belongs at the time of the request for display and with the information input field, and displays at least one extracted character string information item as input guidance along with the information input field.

5. The information input system according to claim 4, wherein in response to organization information relating to an organization structure indicating a relationship between respective groups, including the group, being provided to each of the groups to which the person inputting information belong, the recording section further associates and records the character string information with the organization information, and
wherein in response to a request for display of the information input field being received from one of the plurality of persons inputting information, the guidance display section extracts at least one character string information item based on the organization information recorded by the recording section and displays the at least one extracted character string information item as input guidance along with the information input field.

6. The information input system according to claim 5, wherein the organization information is organization information relating to a hierarchical organization structure indicating parent-child relationships of the respective groups, and
wherein in response to the request for display of the information input field being received from one of the plurality of persons inputting information, the guidance display section specifies parent group information of a group to which one of the plurality of persons inputting information belongs based on the organization information recorded by the recording section, extracts at least one character string information item associated and recorded with the parent group information and the information input field, and displays at least one extracted character string information item as input guidance along with the information input field.

7. The information input system according to claim 3, wherein in response to organization information relating to an organization structure indicating a relationship between respective groups, including the group, being provided to each of the groups to which the person inputting information belong, the recording section further associates and records the character string information with the organization information, and
wherein in response to a request for display of the information input field being received from one of the plurality of persons inputting information, the guidance display section extracts at least one character string information item based on the organization information recorded by the recording section and displays the at least one extracted character string information item as input guidance along with the information input field.

8. The information input system according to claim 7, wherein the organization information is organization information relating to a hierarchical organization structure indicating parent-child relationships of the respective groups, and wherein in response to the request for display of the information input field being received from one of the plurality of persons inputting information, the guidance display section specifies parent group information of a group to which one of the plurality of persons inputting information belongs based on the organization information recorded by the recording section, extracts at least one character string information item associated and recorded with the parent group information and the information input field, and displays at least one extracted character string information item as input guidance along with the information input field.

9. The information input system according to claim 2,
wherein in response to information of a person inputting information for specifying each of the persons inputting information being provided to each of the plurality of persons inputting information, the recording section associates and records input information which is input to the information input field displayed by the information input field display section with the
wherein in response to the request for display of the information input field being received from one of the plurality of persons inputting information, the guidance display section extracts at least one character string information item associated and recorded, by the recording section, with the information of the person inputting information for specifying the one of the persons inputting information and the information input field, and displays at least one extracted character string information item as input guidance along with the information input field.

10. The information input system according to claim 1,
wherein in response to group information for specifying a group to which each of the plurality of persons inputting information belong being provided to each of the persons inputting information,
the recording section further associates and records the character string information with the group information for specifying a group to which the person inputting information in the information input field displayed by the information input field display section belongs at the time of the input.

11. The information input system according to claim 10,
wherein in response to a request for display of the information input field being received from one of the plurality of persons inputting information,
the guidance display section extracts at least one character string information item which is associated and recorded, by the recording section, with group information for specifying a group to which the one of the plurality of persons inputting information belongs at the time of the request for display and with the information input field, and displays at least one extracted character string information item as input guidance along with the information input field.

12. The information input system according to claim 11,
wherein in response to organization information relating to an organization structure indicating a relationship between respective groups, including the group, being provided to each of the groups to which the person inputting information belong, the recording section further associates and records the character string information with the organization information, and
wherein in response to a request for display of the information input field being received from one of the plurality of persons inputting information, the guidance display section extracts at least one character string information item based on the organization information recorded by the recording section and displays the at least one extracted character string information item as input guidance along with the information input field.

13. The information input system according to claim 12,
wherein the organization information is organization information relating to a hierarchical organization structure indicating parent-child relationships of the respective groups, and
wherein in response to the request for display of the information input field being received from one of the plurality of persons inputting information, the guidance display section specifies parent group information of a group to which one of the plurality of persons inputting information belongs based on the organization information recorded by the recording section, extracts at least one character string information item associated and recorded with the parent group information and the information input field, and displays at least one extracted character string information item as input guidance along with the information input field.

14. The information input system according to claim 10,
wherein in response to organization information relating to an organization structure indicating a relationship between respective groups, including the group, being provided to each of the groups to which the person inputting information belong, the recording section further associates and records the character string information with the organization information, and
wherein in response to a request for display of the information input field being received from one of the plurality of persons inputting information, the guidance display section extracts at least one character string information item based on the organization information recorded by the recording section and displays the at least one extracted character string information item as input guidance along with the information input field.

15. The information input system according to claim 14,
wherein the organization information is organization information relating to a hierarchical organization structure indicating parent-child relationships of the respective groups, and
wherein in response to the request for display of the information input field being received from one of the plurality of persons inputting information, the guidance display section specifies parent group information of a group to which one of the plurality of persons inputting information belongs based on the organization information recorded by the recording section, extracts at least one character string information item associated and recorded with the parent group information and the information input field, and displays at least one extracted character string information item as input guidance along with the information input field.

16. The information input system according to claim 1,
wherein in response to information of a person inputting information for specifying each of the persons inputting information being provided to each of the plurality of persons inputting information, the recording section associates and records input information which is input to the information input field displayed by the information input field display section with the information input field and the information of the person inputting information, and
wherein in response to the request for display of the information input field being received from one of the plurality of persons inputting information, the guidance display section extracts at least one character string information item associated and recorded, by the recording section, with the information of the person inputting information for specifying the one of the persons inputting information and the information input field, and displays at least one extracted character string information item as input guidance along with the information input field.

17. The information input system according to claim 1, wherein the guidance display section, in response to determining that a character string information item associated with the information input by at least one of the plurality of persons inputting the request is not received from the problem-specifying person, sets a character string information item associated with information input by another one of the plurality of persons into the information input field as the character string information item associated with the information input by the at least one of the plurality of persons and displays character string information as the input guidance along with the previously input information in response to the request.

18. The information input system according to claim 1, wherein the user interface comprises a display of the previously input information in the information input field in a same format as a second user interface in which the previously input information was input, and
  wherein the user interface differs from the second user interface in that the user interface comprises a display of a specified problem input field whereas the second user interface instead comprises a display in which the specified problem input field is replaced by at least one icon configured to display the character string alongside the information input field in response to a user selection of the at least one icon.

19. The information input system according to claim 1, wherein the information input field display section displays the information input field and the character string side by side in a second same window, and
  wherein the previously input information is received by the information input field display section in the second same window.

20. A non-transitory computer readable medium storing a program which when executed causes at least one hardware processor to implement:
  an information input field display section that displays an information input field for inputting information for each of a plurality of persons inputting information;
  a specified problem input field display section that displays a specified problem input field for inputting a character string indicating a specified problem with respect to the input information for a problem-specifying person who is different from the plurality of persons inputting information, wherein the specified problem input field display section is configured to receive the character string in the specified problem input field of a user interface in a same window also displaying previously input information in the information input field;
  a recording section that associates and records character string information with the information input field in response to an input of the character string being received from the problem-specifying person; and
  a guidance display section that displays, as an input guidance, at least one character string information item, which is recorded by the recording section, along with the information input field, in response to a request for display of the information input field being received from any one of the plurality of persons inputting information,
  wherein the specified problem input field display section displays the specified problem input field side by side with the previously input information in the same window.

21. An information input system comprising:
at least one hardware processor configured to implement:
  an information input field display section that displays an information input field for inputting information for each of a plurality of persons inputting information;
  a specified problem input field display section that displays a specified problem input field for inputting a character string indicating a specified problem with respect to the input information for a problem-specifying person who is different from the plurality of persons inputting information, wherein the specified problem input field display section is configured to receive the character string in the specified problem input field of a user interface in a same window also displaying previously input information in the information input field;
  a recording section that associates and records character string information with the information input field in response to an input of the character string being received from the problem-specifying person; and
  a guidance display section that controls display, as input guidance, of at least one character string information item, which is recorded by the recording section, along with the information input field, in response to a request for display of the information input field being received from any one of the plurality of persons inputting information,
wherein the user interface comprises a display of the previously input information in the information input field in a same format as a second user interface in which the previously input information was input, and
wherein the user interface differs from the second user interface in that the user interface comprises a display of a specified problem input field whereas the second user interface instead comprises a display in which the specified problem input field is replaced by at least one icon configured to display the character string alongside the information input field in response to a user selection of the at least one icon.

* * * * *